(12) United States Patent  
Evensen

(10) Patent No.: US 9,273,763 B2  
(45) Date of Patent: Mar. 1, 2016

(54) SYSTEMS AND METHODS FOR UNLOCKING/LOCKING AND OPENING/CLOSING WINDOWS

(71) Applicant: Kenneth R Evensen, Naperville, IL (US)

(72) Inventor: Kenneth R Evensen, Naperville, IL (US)

(73) Assignee: ELSTON WINDOW & WALL, LLC, Chicago, IL (US)

( * ) Notice: Subject to any disclaimer, the term of this patent is extended or adjusted under 35 U.S.C. 154(b) by 571 days.

(21) Appl. No.: 13/663,798

(22) Filed: Oct. 30, 2012

(65) Prior Publication Data

US 2014/0007720 A1 Jan. 9, 2014

Related U.S. Application Data

(63) Continuation-in-part of application No. 13/540,878, filed on Jul. 3, 2012.

(51) Int. Cl.
| | |
|---|---|
| *E05C 9/16* | (2006.01) |
| *F16H 21/44* | (2006.01) |
| *E05C 9/10* | (2006.01) |
| *E05C 17/32* | (2006.01) |
| *E05B 1/00* | (2006.01) |
| *E05D 15/30* | (2006.01) |
| *E05C 9/00* | (2006.01) |
| *E05D 15/40* | (2006.01) |
| *E05B 15/00* | (2006.01) |

(52) U.S. Cl.
CPC ............. *F16H 21/44* (2013.01); *E05B 1/0053* (2013.01); *E05C 9/10* (2013.01); *E05C 17/32* (2013.01); *E05D 15/30* (2013.01); *E05B 15/00* (2013.01); *E05D 15/40* (2013.01); *E05Y 2201/68* (2013.01); *E05Y 2800/372* (2013.01); *Y10S 292/20* (2013.01); *Y10S 292/47* (2013.01); *Y10T 74/1892* (2015.01)

(58) Field of Classification Search
CPC .......... E05B 15/00; E05F 11/00; E05F 11/34; E05D 15/40; Y10S 292/20; Y10S 292/47
USPC .............. 292/26, 18, 158, 161, 217, DIG. 20, 292/DIG. 27, DIG. 47, DIG. 60; 16/324, 362; 49/183–185, 449
See application file for complete search history.

(56) References Cited

U.S. PATENT DOCUMENTS

| | | | | |
|---|---|---|---|---|
| 164,466 | A | * | 6/1875 | Manning .................. 292/272 |
| 611,291 | A | * | 9/1898 | Stebbins ................... 292/263 |
| 641,407 | A | * | 1/1900 | Schacht .................... 292/263 |
| 794,463 | A | * | 7/1905 | Nichols .................... 292/263 |
| 2,791,456 | A | | 5/1957 | Roehl | 
| 3,091,978 | A | | 6/1963 | Rubinstein |

(Continued)

*Primary Examiner* — Carlos Lugo  
(74) *Attorney, Agent, or Firm* — McAndrews, Held & Malloy, Ltd.

(57) ABSTRACT

Certain embodiments provide systems and methods for unlocking, opening, closing and locking a vent sash. The system may include a push arm configured to extend to open the vent sash and retract to close the vent sash. The system may include a guide arm configured to extend to unlock the vent sash and retract to lock the vent sash. The system may include a handle extension configured to radially rotate substantially one hundred eighty degrees in a first direction on a single plane to extend the push arm and the guide arm. The handle extension may be configured to radially rotate substantially one hundred eighty degrees in a second direction on the single plane to retract the push arm and the guide arm.

22 Claims, 19 Drawing Sheets

(56) References Cited

U.S. PATENT DOCUMENTS

| | | | |
|---|---|---|---|
| 3,214,157 A * | 10/1965 | Stavenau | 49/324 |
| 3,633,315 A | 1/1972 | Lorenz | |
| 3,927,492 A | 12/1975 | Carson | |
| 3,974,753 A | 8/1976 | Blomgren | |
| 4,086,727 A | 5/1978 | Kuyper | |
| 4,136,578 A | 1/1979 | Van Klompenburg | |
| 4,195,866 A | 4/1980 | Tundo | |
| 4,206,939 A | 6/1980 | Rowley | |
| 4,253,276 A * | 3/1981 | Peterson et al. | 49/249 |
| 4,257,632 A | 3/1981 | DeStepheno | |
| 4,300,794 A | 11/1981 | Dunsmoor | |
| 4,305,228 A * | 12/1981 | Nelson | 49/252 |
| 4,350,376 A | 9/1982 | Bascou | |
| 4,435,007 A | 3/1984 | Bascou | |
| 4,466,644 A | 8/1984 | Wooten | |
| 4,469,370 A | 9/1984 | Peteren | |
| 4,484,773 A | 11/1984 | Lehne | |
| 4,534,587 A | 8/1985 | Fleming | |
| 4,615,236 A | 10/1986 | Boots | |
| 4,618,176 A | 10/1986 | Farmont | |
| 4,803,808 A * | 2/1989 | Greisner | 49/394 |
| 4,823,508 A * | 4/1989 | Allen | 49/252 |
| 4,923,232 A | 5/1990 | Kawagoe | |
| 4,928,547 A | 5/1990 | Huyer | |
| 4,937,976 A * | 7/1990 | Tucker et al. | 49/345 |
| 4,991,886 A * | 2/1991 | Nolte et al. | 292/161 |
| 5,118,145 A * | 6/1992 | Tucker | 292/158 |
| 5,152,103 A * | 10/1992 | Tucker et al. | 49/279 |
| 5,168,770 A | 12/1992 | Ellis | |
| RE34,230 E * | 4/1993 | Tucker et al. | 49/279 |
| 5,201,241 A | 4/1993 | Pollack | |
| 5,346,267 A | 9/1994 | Betteridge | |
| 5,400,473 A | 3/1995 | Delman | |
| 5,410,778 A | 5/1995 | Langevin | |
| 5,438,801 A | 8/1995 | Ishihara | |
| 5,467,503 A | 11/1995 | Nolte | |
| 5,509,234 A * | 4/1996 | Klimek et al. | 49/342 |
| 5,531,045 A * | 7/1996 | Piltingsrud | 49/279 |
| 5,560,082 A | 10/1996 | Vetter | |
| 5,740,632 A | 4/1998 | Peterson | |
| 5,741,031 A * | 4/1998 | Bauman et al. | 292/139 |
| 5,802,673 A | 9/1998 | Nemeth | |
| 5,815,984 A * | 10/1998 | Sheets et al. | 49/246 |
| 5,839,229 A * | 11/1998 | Briggs et al. | 49/246 |
| 5,901,501 A | 5/1999 | Fountaine | |
| 5,927,767 A * | 7/1999 | Smith et al. | 292/158 |
| 5,927,768 A * | 7/1999 | Dallmann et al. | 292/158 |
| 5,937,582 A | 8/1999 | Taylor | |
| 5,964,011 A * | 10/1999 | Ruston et al. | 16/239 |
| 6,032,990 A | 3/2000 | Stone | |
| 6,035,492 A | 3/2000 | Warshaviak | |
| 6,044,587 A * | 4/2000 | Vetter et al. | 49/324 |
| 6,065,248 A * | 5/2000 | Sasaki et al. | 49/394 |
| 6,102,456 A | 8/2000 | Boersma | |
| 6,109,668 A * | 8/2000 | Demarco | 292/161 |
| 6,122,863 A * | 9/2000 | Tippin et al. | 49/279 |
| 6,123,135 A | 9/2000 | Mathews | 160/26 |
| 6,135,511 A * | 10/2000 | Smith et al. | 292/156 |
| 6,164,156 A | 12/2000 | Purcell | |
| 6,230,457 B1 * | 5/2001 | Brautigam | 52/204.69 |
| 6,367,853 B1 * | 4/2002 | Briggs | 292/336.3 |
| 6,431,620 B2 * | 8/2002 | Tremblay et al. | 292/263 |
| 6,450,063 B1 | 9/2002 | Harvey | |
| 6,598,265 B2 | 7/2003 | Lee | |
| 6,612,628 B1 | 9/2003 | Herbst | |
| 6,640,389 B2 | 11/2003 | Van Klompenburg | |
| 6,767,038 B1 * | 7/2004 | Huml | 292/158 |
| 6,837,004 B2 * | 1/2005 | Annes | 49/394 |
| 6,908,124 B2 | 6/2005 | Colicino | |
| 7,004,515 B2 * | 2/2006 | Timothy | 292/137 |
| 7,066,505 B2 | 6/2006 | Van Klompenburg | |
| 7,147,256 B2 | 12/2006 | Gill | |
| 7,194,930 B2 | 3/2007 | Dawson | |
| 7,219,386 B2 * | 5/2007 | Tsuchiya et al. | 15/144.4 |
| 7,251,860 B2 | 8/2007 | Liang | |
| 7,614,184 B2 * | 11/2009 | Rebel et al. | 49/345 |
| 7,708,322 B2 * | 5/2010 | Timothy et al. | 292/137 |
| 7,900,322 B2 * | 3/2011 | Doring et al. | 16/362 |
| 7,941,898 B2 | 5/2011 | Liang | |
| 8,555,548 B2 * | 10/2013 | Carter | 49/249 |
| 2002/0066162 A1 * | 6/2002 | Klompenburg et al. | 16/429 |
| 2005/0050663 A1 * | 3/2005 | Goulet | 15/144.4 |

* cited by examiner

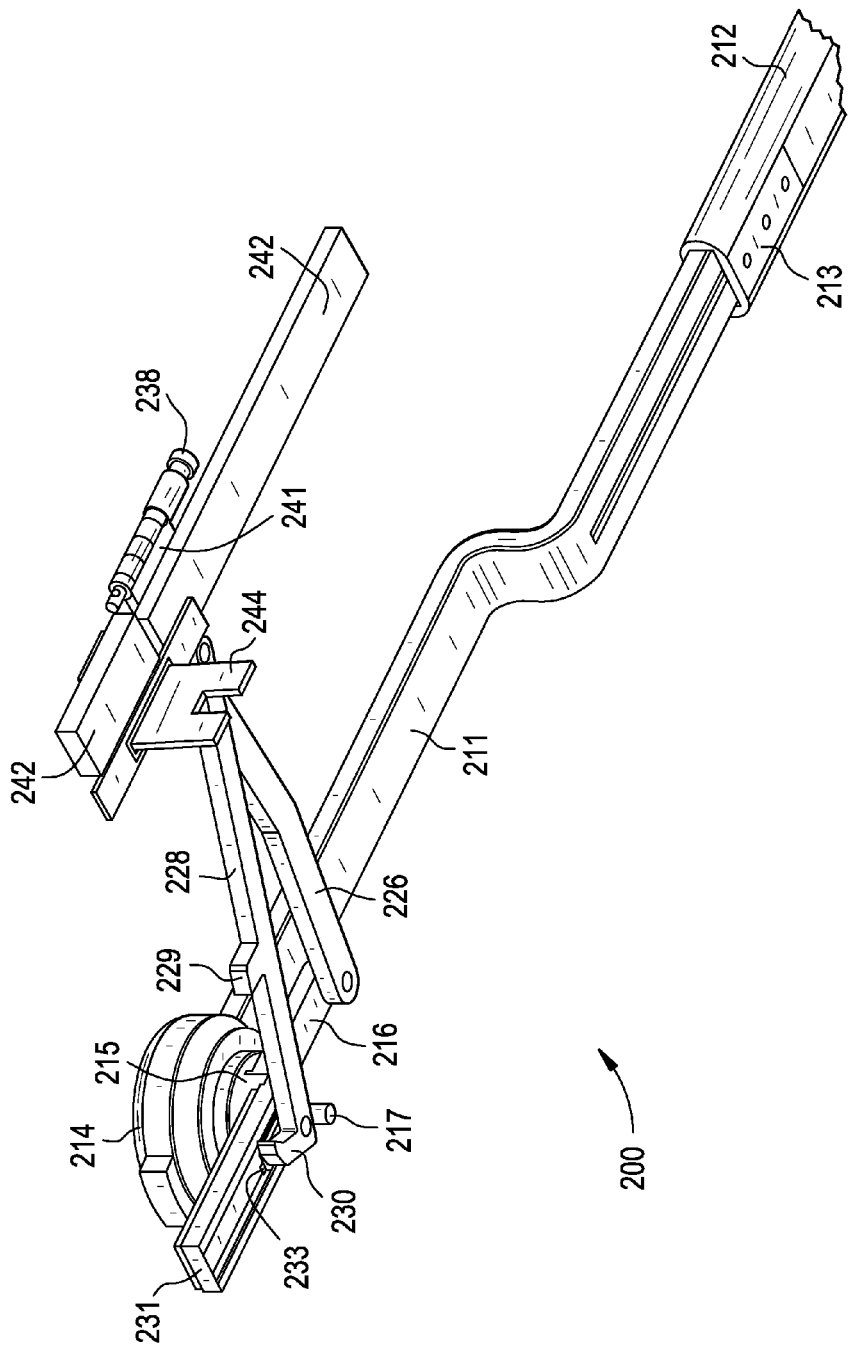

1910 — Handle extension is radially pivoted substantially one hundred eighty (180) degrees in a first direction on a single plane from a locked and closed position to an unlocked and open position.

1920 — Handle extension is radially pivoted substantially one hundred eighty (180) degrees in a second direction, opposite the first direction, on the single plane from the unlocked and open position to the locked and closed position.

SYSTEMS AND METHODS FOR UNLOCKING/LOCKING AND OPENING/CLOSING WINDOWS

CROSS-REFERENCE TO RELATED APPLICATIONS/INCORPORATION BY REFERENCE

The present application is a continuation-in-part of, makes reference to, claims priority to, and claims benefit from copending U.S. patent application Ser. No. 13/540,878 filed Jul. 3, 2012 entitled "Systems and Methods for Unlocking/Locking and Opening/Closing Windows," the entire contents of which are hereby expressly incorporated by reference herein.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to systems and methods for unlocking/locking and opening/closing windows without excessive force and twisting. More specifically, certain embodiments provide a lever mechanism configured to unlock and open an operable vent sash by pivoting substantially one hundred and eighty (180) degrees in a first radial direction on a single plane, and configured to lock and close the operable vent sash by pivoting substantially one hundred and eighty (180) degrees in a second radial direction on the single plane. The force required to pivot the lever mechanism for any operation does not exceed five (5) pounds (lbs.).

BACKGROUND OF THE INVENTION

The Americans with Disabilities Act (ADA), which affects many public and private commercial buildings, is intended to ensure equal access to all persons regardless of physical disabilities. Section 309.4 of the ADA accessibility guidelines related to window and door hardware sets forth that "[o]perable parts shall be operable with one hand and shall not require tight grasping, pinching, or twisting of the wrist. The force required to activate operable parts shall be 5 pounds (22.2 N) maximum." The Department of Justice Standards for Accessible Design (4.27.4) and the International Building Code (ANSI 309.4) set forth similar guidelines.

Architects prefer larger vents for exterior window designs to meet fresh air ventilation requirements. Using a larger quantity of smaller vents is typically more expensive than using a fewer quantity of larger vents. Additionally, current energy codes and specifications require low thermal insulating values for windows. Insulated glass has a better insulating value than metal, so the more metal used in a window system, the lower the insulating value. Because the exterior seal of a vent is subject to lower insulating values by nature and is a weak thermal point in the window system, a larger vent size helps to offset the overall insulating value due to the greater percentage of glass. A larger vent helps in the insulating performance but a larger vent takes more force to open.

Although using larger vents may improve insulating performance and decrease costs for architects, larger vents are typically more difficult to open and close. More specifically, an insulated glass unit weighs approximately seven (7) lbs. per square foot and can weigh as much as eight and one half (8.5) lbs. per square foot for insulated laminated glass. When aluminum and other materials are added to construct the vent frame and sash, a vent can weigh around nine (9) lbs. per square foot or more. As such, a four (4) foot by five (5) foot vent may weigh approximately one hundred and eighty-nine (189) lbs. or more, which may be difficult to open using not more than five (5) lbs. of operational force as required by applicable ADA and other guidelines.

In addition to generally being more difficult to open and close, larger vents are also typically more difficult to lock and unlock. Vents, like other window systems, are manufactured and installed to meet strict air and water performance specifications. As such, to compress a sash to a vent frame of the window system, a great deal of compressive force can be needed to make the system air and water tight. The compression of the sash to the vent frame is commonly achieved by the locking of the sash using the vent handle, which moves one or more transmission bars inside a euro-grove (or vent track) around the perimeter of the sash when the vent handle is rotated in one direction.

For example, FIG. 1 is a diagram that illustrates an exemplary awning vent 100 with an exemplary locking mechanism as is known in the art. Referring to FIG. 1, the exemplary locking mechanism of the exemplary awning vent 100 may comprise, as an example, a handle 101, handle connectors 102, main transmission bars 103, transmission device connectors 104, 105, 110, corner transmission device housings 106, keepers 107, locking points 108, side transmission bars 109, and friction hinges 111. The handle 101 can attach to an inner portion of the sash. Certain components on an underside of the handle 101 may extend through the sash to an outer portion of the sash.

The handle connectors 102 may couple to the underside of the handle 101 at the outer portion of the sash and slidably fit in a euro-grove (not shown) that extends around an outer perimeter of the sash. Transmission bars 103 can attach to the handle connectors 102 at one end and corner transmission device connectors 104 at the other end, and may slidably fit in the euro-grove. The corner transmission device connectors 104 may slidably fit into corner transmission device housings 106. An outward, horizontal force on corner transmission device connectors 104 may cause the corner transmission device connectors 104 to extend into the corner transmission device housings 106, which in turn may cause the corner transmission device connectors 105 to extend vertically in the exemplary awning vent illustrated in FIG. 1.

Referring still to FIG. 1, side transmission bars 109 may attach to the corner transmission device connectors 105 at one end and transmission device connectors 110 at the other end, and may slidably fit in the euro-grove. Friction hinges 111 can attach to the sash and vent frame on both sides of the exemplary awning vent 100 and may be operable to guide and support the sash when venting as well as limit the opening range of the sash.

Locking points 108 may be attached to, or integrated with, one or more transmission bars 103, 109, or other components of the vent locking mechanism such as the transmission device connectors 104, 105, and 110, and may engage (or mate) with keepers 107, positioned at corresponding points on the vent frame, when moved by the handle 101 to the locking position. The engaging of the locking points 108 with the keepers 107 results in compression of the sash to the vent frame to make a tight seal. The larger the vent 100, the more locking points 108 and keepers 107 are needed to achieve an adequate seal. Further, the more locking points 108 and keepers 107, the more force is needed to lock and unlock the vent.

Many current vent designs for exterior windows require in excess of five (5) lbs. of force to open/close a sash. For example, many current vent designs do not use any mechanisms to open/close a sash (e.g., push open and pull closed), which may require more than five (5) lbs. of force, particularly for larger vents. Further, current vent designs that do have mechanisms for opening/closing a sash may not alleviate the force necessary to open/close the sash to meet the ADA guidelines. Instead, some mechanisms, such as cranks, not only may require more force to open, but also require excessive twisting. Additionally, many current vent designs for exterior windows require in excess of five (5) lbs. of force to lock/unlock a sash, particularly for larger vents having locking mechanisms with more locking points. Also, many current vent designs that do have mechanisms for opening/closing a sash use different mechanisms to unlock/lock a sash. Further, several existing vent designs require separate, independent movements in different planes to unlock/lock and/or open/close a sash.

As such, there is a need for providing systems and methods for unlocking/locking and opening/closing windows without excessive force and twisting by combining operations (e.g., unlocking and opening, or locking and closing) into a single fluid movement in a single plane (i.e., a single axis movement) using a single mechanism.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Systems and methods for unlocking/locking and opening/closing windows without excessive force and twisting is provided, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 18 is a diagram that illustrates a rear, bottom, perspective view of an exemplary double-acting lever mechanism in an unlocked/open position and without frames and covers in accordance with an embodiment of the present invention.

FIG. 19 is a flow diagram that illustrates exemplary steps for unlocking, opening, closing and locking a vent sash in accordance with an embodiment of the present invention.

Figure 1:
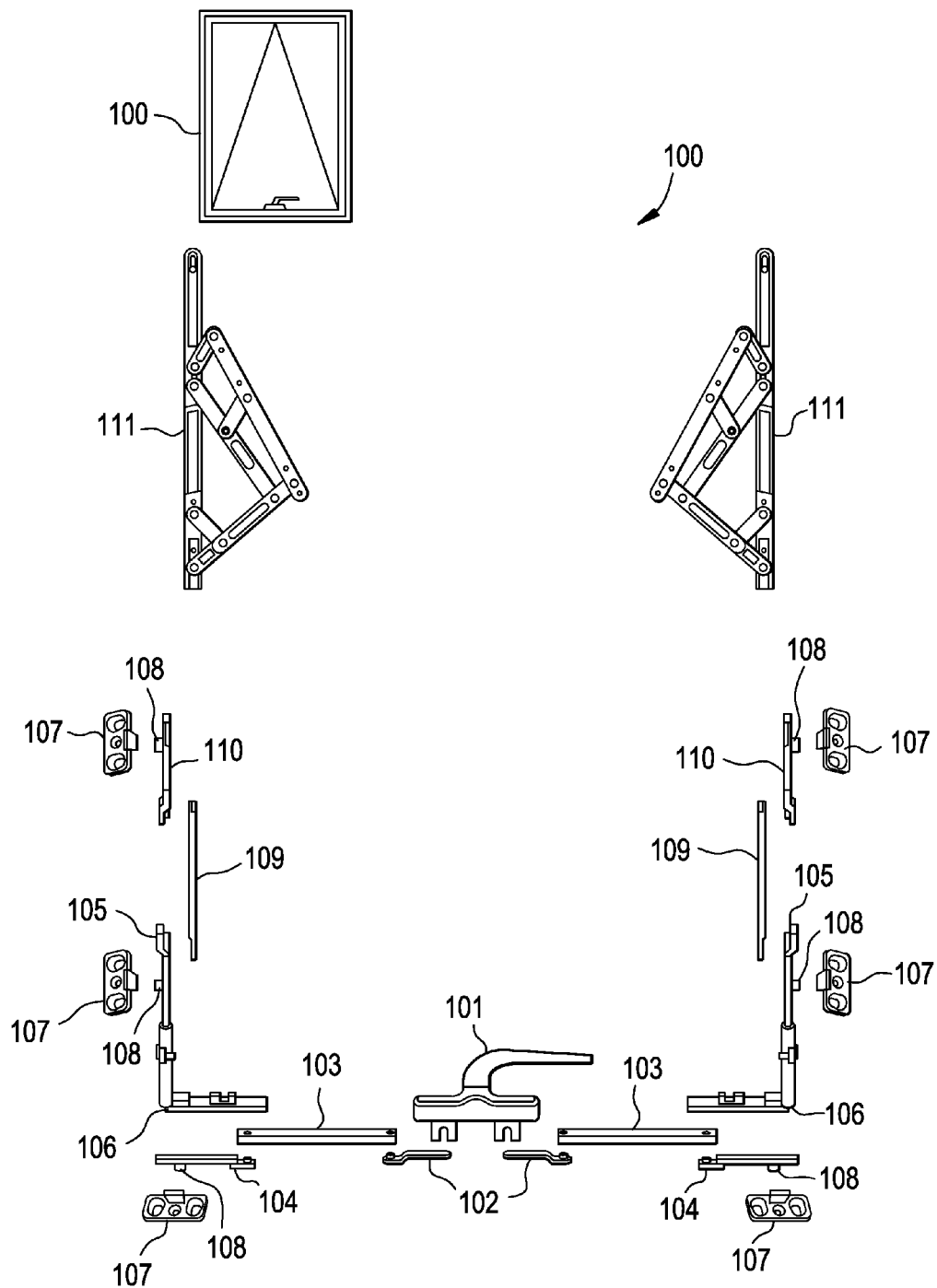
FIG. 1 is a diagram that illustrates an exemplary awning vent with an exemplary locking mechanism as is known in the art.

The foregoing summary, as well as the following detailed description of certain embodiments of the present invention, may be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION

Certain embodiments of the invention may be found in systems and methods for unlocking/locking and opening/ closing windows without excessive force and twisting. More specifically, certain embodiments provide a lever mechanism 200 configured to unlock and open an operable vent sash 310 by pivoting substantially one hundred and eighty (180) degrees in a first radial direction on a single plane, and configured to lock and close the operable vent sash 310 by pivoting substantially one hundred and eighty (180) degrees in a second radial direction on the single plane. The force required to pivot the lever mechanism 200 for any operation does not exceed five (5) pounds (lbs.).

Various embodiments provide a lever mechanism system 200 for unlocking, opening, closing and locking a vent sash 310. The lever mechanism system 200 may comprise a push arm 226 configured to extend to open the vent sash 310 and retract to close the vent sash 310. The lever mechanism system 200 may comprise a guide arm 228 configured to extend to unlock the vent sash 310 and retract to lock the vent sash 310. The lever mechanism system 200 may comprise a handle extension 211 configured to radially rotate substantially one hundred eighty degrees in a first direction on a single plane to extend the push arm 226 and the guide arm 228. The handle extension 211 may be configured to radially rotate substantially one hundred eighty degrees in a second direction on the single plane to retract the push arm 226 and the guide arm 228.

Certain embodiments provide a method 1900 for unlocking, opening, closing and locking a vent sash. The method 1900 may comprise radially pivoting 1910 a handle extension 211 substantially one hundred eighty degrees in a first direction on a single plane from a locked and closed position to an unlocked and open position. The method 1900 may comprise radially pivoting 1920 the handle extension 211 substantially one hundred eighty degrees in a second direction on the single plane from the unlocked and open position to the locked and closed position.

Although certain embodiments in the foregoing description may be described in reference to awning vents, unless so claimed, the scope of various aspects of the present invention should not be limited to awning vents and may additionally and/or alternatively be applicable to casement vents, hopper vents, or any suitable vent. Further, although the viewpoint of FIGS. 2-18 may appear as though the double-acting lever mechanism is attached at a base of a vent, the scope of various aspects of the present invention should not be limited to the viewpoint of the handle and/or double-acting lever mechanism being positioned at a base of a vent and may additionally and/or alternatively be a viewpoint of the handle and/or double-acting lever mechanism being positioned at any side and position along the perimeter of the vent. Additionally, although certain embodiments in the foregoing description may describe the double-acting lever mechanism as interacting with a euro-grove/transmission bar locking system as illustrated in FIG. 1, for example, unless so claimed, the scope of various aspects of the present invention should not be limited to euro-grove/transmission bar locking systems and may additionally and/or alternatively be applicable to any suitable vent locking system.

Figure 2:
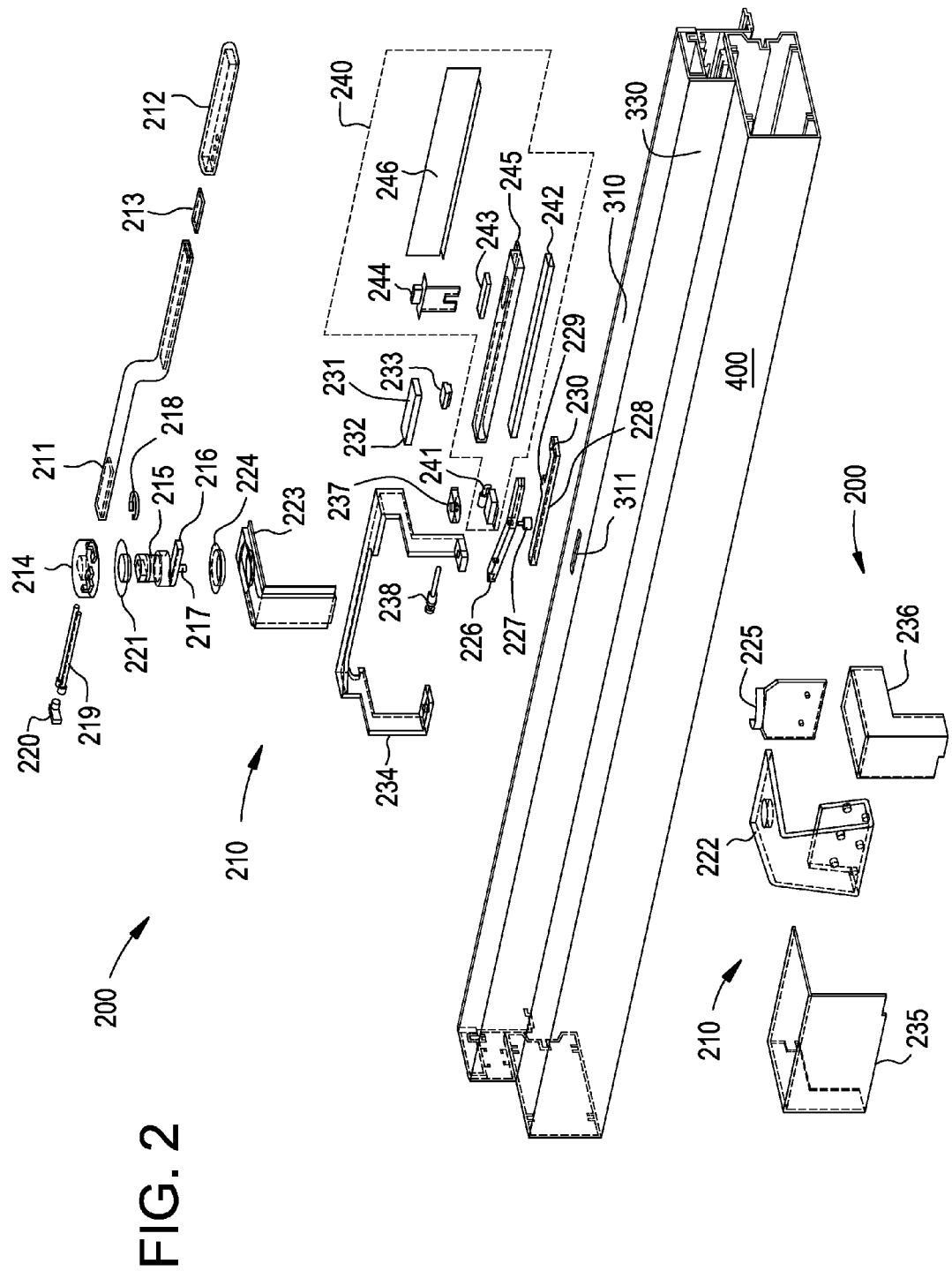
FIG. 2 is a diagram that illustrates a front exploded view of an exemplary double-acting lever mechanism in accordance with an embodiment of the present invention.
Figure 3:
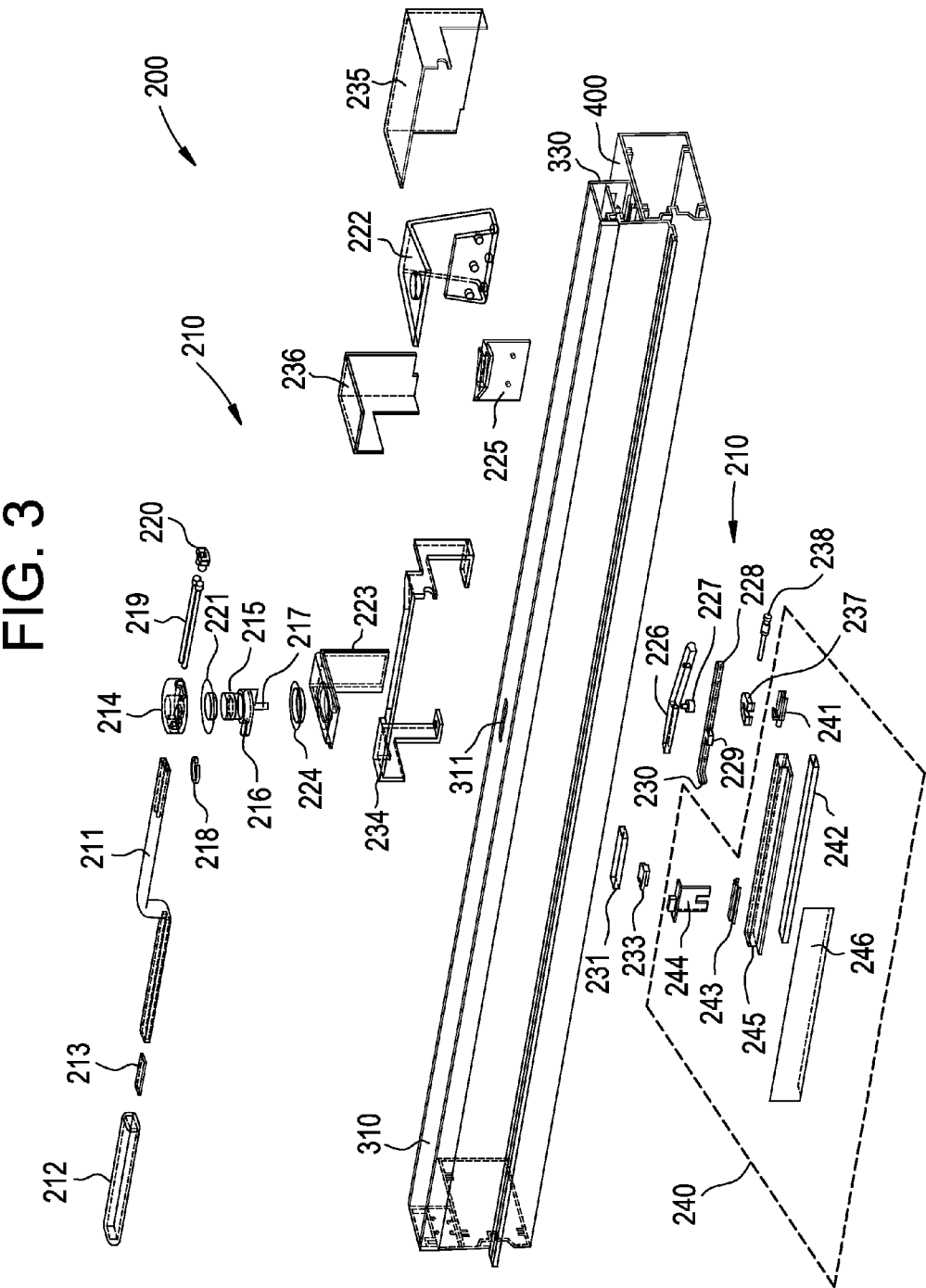
FIG. 3 is a diagram that illustrates a rear exploded view of an exemplary double-acting lever mechanism in accordance with an embodiment of the present invention.

FIG. 2 is a diagram that illustrates a front exploded view of an exemplary double-acting lever mechanism in accordance with an embodiment of the present invention. FIG. 3 is a diagram that illustrates a rear exploded view of an exemplary double-acting lever mechanism.

Referring to FIGS. 2-3, there is shown an exemplary double-acting lever mechanism 200 comprising an exemplary frame assembly 210 and an exemplary sash assembly 240. Double-acting refers to the two separate and distinct actions (e.g., locking/unlocking and opening/closing) provided by the lever mechanism 200 by pivoting substantially one hundred and eighty (180) degrees (i.e., 170-190 degrees) on a single plane (i.e., a single axis movement). Also illustrated in FIGS. 2-3 are a window frame 400, a vent stop 330 and a vent sash 310. The vent sash 310 can comprise a transmission fork slot 311 that provides an interface to the main transmission bars 103 of the exemplary locking mechanism as discussed above with regard to FIG. 1, for example. In certain embodiments, the transmission fork slot 311 may be created in at least a portion of an existing opening left by a handle 101 that is removed to retrofit the vent sash 310 with the double-acting lever mechanism 200. Certain embodiments comprise an air barrier (not shown) for sealing an existing sash slot and creating the transmission fork slot 311 on the vent sash 310. Additionally and/or alternatively, the transmission fork slot 311 for the lever mechanism 200 can be included in the vent sash 310 at the time of manufacture.

Figure 15:
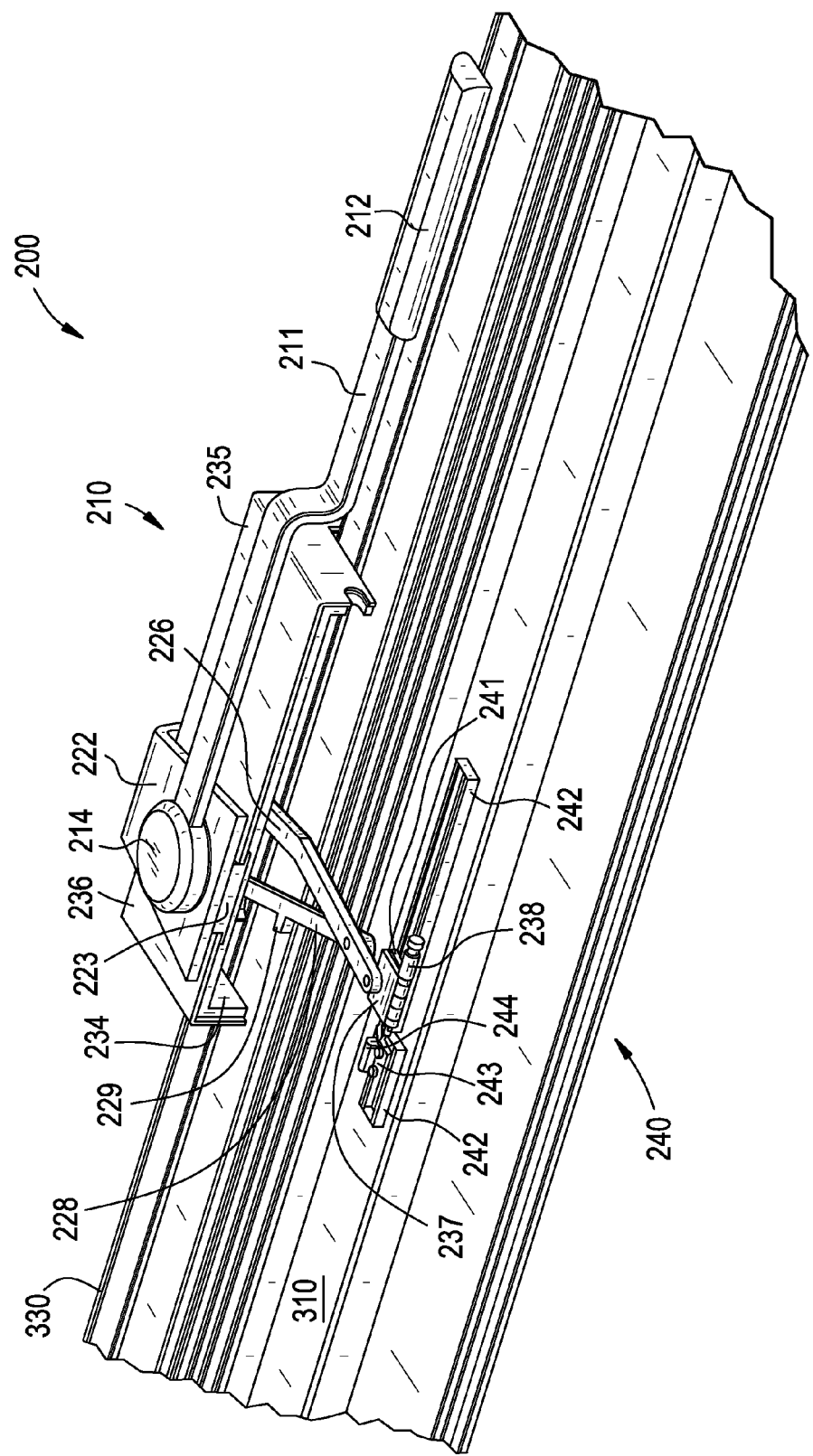
FIG. 15 is a diagram that illustrates a rear perspective view of an exemplary double-acting lever mechanism in an unlocked/open position in accordance with an embodiment of the present invention.
Figure 16:
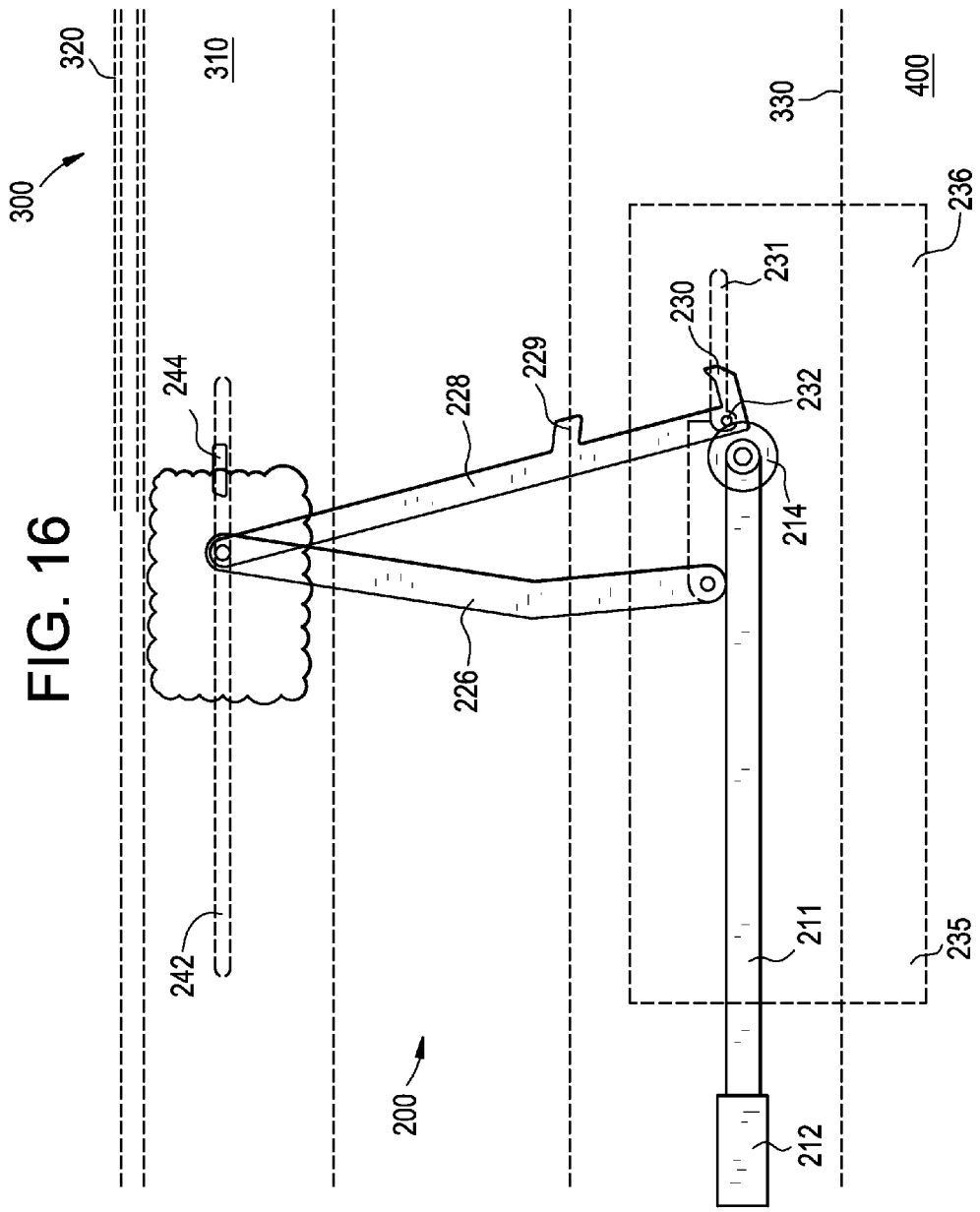
FIG. 16 is a diagram that illustrates a top view of an exemplary double-acting lever mechanism in an unlocked/open position in accordance with an embodiment of the present invention.

In various embodiments, the sash assembly 240 may comprise one or more sash slide bars 242, a hinge mount slide 241, a transmission fork slide 243, and/or a transmission fork 244, for example. The sash slide bar(s) 242 is mounted to the vent sash 310 and is configured to receive the hinge mount slide 241 and transmission fork slide 245. The hinge mount slide 241 and the transmission fork slide 245 are slidable within and/or on the sash slide bar(s) 242. For example, in certain embodiments, the hinge mount slide 241 and the transmission fork slide 243 may be slidable within a single sash slide bar 242 (as illustrated in FIG. 16). As another example, in various embodiments, the hinge mount slide 241 and the transmission fork slide 243 can be slidable within separate corresponding sash slide bars 242 (as illustrated in FIGS. 2-15 and 17-18). The one or more sash slide bars 242 may comprise end caps at the ends of the sash slide bar(s) 242 to prevent the slides 241, 243 from sliding out of the sash slide bar(s) 242 and to present a clean finish. Certain embodiments provide that the slide bar(s) 242 is a metal, such as aluminum, for example, or any suitable material. Various embodiments provide that slides 241, 243 may be any suitable slidable material, such as nylon, for example. In certain embodiments, the slide bar(s) 242 and/or the slides 241, 243 may be lubricated with grease, or any suitable lubricant, to reduce friction and allow for easier sliding of the slides 241, 243 within and/or on the slide bar(s) 242.

In certain embodiments, the transmission fork 244 may extend through the transmission fork slot 311 of the sash 310 and couple at one end to a locking mechanism, such as the transmission bars 103 of the exemplary locking mechanism discussed above with regard to FIG. 1, for example. The other end of the transmission fork 244 may be coupled to the transmission fork slide 243. In certain embodiments, the transmission fork 244 can slide with transmission fork slide 243 within sash slide bar 242 so that the locking mechanism can lock or unlock the vent sash 310 when the transmission fork 244 is engaged, by projections 229, 230 of a guide arm 228 as discussed in more detail below, for example.

Still referring to FIGS. 2-3, the hinge mount slide 241 may couple the sash assembly 240 to the frame assembly 210. For example, the hinge mount slide 241 can be releasably attached to a hinge mount 237 using a quick release pin 238, or any suitable releasable attachment mechanism. As such, at least the opening/closing operation of the lever mechanism 200 can be disabled by de-coupling the sash assembly 240 from the frame assembly 210. When the sash assembly 240 is coupled to the frame assembly 210, as discussed in more detail below, rotation or pivoting of a handle extension 211 of the frame assembly 210 may cause a push arm 226 pivotably attached to the hinge mount 237 to slide the hinge mount slide 241 within the sash slide bar 242 in a first direction to extend the vent sash 310 to an open position, or in a second direction to retract the vent sash 310 to a closed position.

In various embodiments, the sash assembly 240 can comprise one or more sash slide bar covers 245, and/or a valance 246, for example. The sash slide bar cover(s) 245 may correspond to the sash slide bar(s) 242 and is configured to house the sash slide bar(s) 242 and the components movable therein to present a clean finish, among other things. The valance 246 may be a back cover for covering the internal components of the lever mechanism 200 that may be otherwise viewable through the glass 320, such that the lever mechanism 200 presents a clean finish, for example.

Referring still to FIGS. 2-3, the frame assembly 210 comprises a handle extension 211, a main transmission 215, one or more frames 222, 223, 234, a push arm 226, and/or a guide arm 228, for example. The handle extension 211 can be substantially straight or be offset (as illustrated in FIGS. 2-5, 7-10, and 12-18) to maintain a low profile adjacent to lever mechanism 200 and the vent sash 310. The handle extension 211 may comprise a telescopic handle 212 adjustably coupled to the handle extension 211 using a slidable threaded insert 213, or any suitable attachment mechanism. For example, in embodiments that use a threaded insert 213, the threaded insert 213 may slide in a groove of the handle extension 211 and screws, or any suitable coupling mechanism, can be inserted and extended through the telescopic handle 212 and threaded insert 213 to hold the telescopic handle 212 in a selected extension position on the handle extension 211. In certain embodiments, the telescopic handle 212 is adjustably coupled to a first end of the handle extension 211. The telescopic handle 212 may include rings, posts, hooks, holes, or any suitable mechanism for providing additional and/or alternative handle grasping options. In certain embodiments, the handle extension 211 may be telescopic and/or otherwise collapsible, foldable, or the like. In various embodiments, the telescopic handle 212 may be collapsible, foldable or the like. In certain embodiments and as discussed in more detail below, the telescopic handle 212 may be grasped and used to rotate or pivot the handle extension 211 to unlock and open, or lock and close, a vent sash 310.

In various embodiments, a second end of the handle extension 211 is coupled to the main transmission 215 at a top cap 214. For example, the top cap 214 may receive the handle extension 211 and main transmission 215. The handle extension 211 and main transmission 215 may be coupled within the top cap 214 using shoulder bolts 219 or any suitable attachment mechanism. The main transmission 215 may correspondingly pivot as the handle extension 211 is pivoted. The top cap 214 can also include screw cap(s) 220, a shoulder washer 221, and a retainer ring 218, for example. The screw cap(s) 220 cover the shoulder bolts 219 or other attachment mechanism to present a clean finish. The shoulder washer 221 couples between the top cap 214 and a main frame 222 (discussed in more detail below) to reduce friction caused by rotation and lateral forces. The retainer ring 218 may provide support for the main transmission 215 in the top cap 214.

Still referring to FIGS. 2-3, main transmission 215 can include a bar 216 and a detent pin 217. The main transmission bar 216 is pivotably attached to the push arm 226 such that the push arm is extended or retracted when the main transmission 215 is pivoted with the rotation of the handle extension 211. The main transmission detent pin 217 may correspondingly rotate as the handle extension 211 is rotated such that the detent pin 217 pushes a pin pivotably connecting the guide arm 228 to a guide arm slide 233. The guide arm slide 233 is slidable within a guide arm slide bar 231 when the detent pin 217 dislodges the connecting pin out of a detent 232 in the guide arm slide bar 231, as discussed in more detail below.

The push arm 226 may be pivotably attached at one end to the main transmission bar 216 and pivotably attached at another end to a hinge mount 237. The guide arm 228 may be pivotably attached to the push arm 226 towards the hinge mount end of the push arm 226 or with the push arm 226 at the hinge mount 237, for example. In certain embodiments, a tension spring (not shown) may be used to couple the central portions of the push arm 226 and guide arm 228 for guiding the extension and retraction of the push arm 226 and guide arm 228 as the handle extension 211 is rotated. In various embodiments, the push arm 226 comprises a roller guide 227 operable to be received by a catch 225 attached to or integrated with the main frame 222. The catch 225 may guide the roller guide 227 and push arm 226 such that the push arm 226 pulls the vent sash 310 taut against the vent stop 330 while the vent sash 310 is in a closed position and is being locked by the lever mechanism 200, for example.

The guide arm 228 can be pivotably attached at one end to the push arm 226 and/or hinge mount 237. At the other end of the guide arm 228, the guide arm 228 may be pivotably attached to a guide arm slide 233 that is slidable within a guide arm slide bar 231. The guide arm 228 may comprise projections 229, 230 configured to engage and slide the transmission fork 244 of the sash assembly 240 between locked and unlocked positions. The guide arm slide bar 231 directs the guide arm 228 pivotably attached to the guide arm slide 233 on a linear path such that the guide arm projections 229, 230 engage and slide the transmission fork 244 as the handle extension 211 is rotated. The guide arm slide bar 231 may be mounted to a support frame 234, or any suitable frame 222, 223, for example. In certain embodiments, the guide arm slide bar 231 is mounted to the underside of the support frame 234. The guide arm slide bar 231 can include a detent 232 for receiving a connecting pin that pivotably attaches the guide arm 228 to the guide arm slide 233. In operation, the connecting pin may be held in the detent 232 of the guide arm slide bar 231, thereby preventing the guide arm 231 from sliding with the guide arm slide 233, while the handle extension 211 is rotating between open/unlocked (as illustrated in FIGS. 14-18) and closed/unlocked (as illustrated in FIGS. 9-13) positions. The main transmission detent pin 217 may correspondingly rotate as the handle extension 211 is rotated such that the detent pin 217 dislodges the connecting pin from the detent 232 as the handle extension 211 pivots from the closed/unlocked position (as illustrated in FIGS. 9-13) to the closed/locked position (as illustrated in FIGS. 4-8).

In various embodiments, the one or more frames 222, 223, 234 comprise a main frame 222, a secondary frame 223, and/or a support frame 234, for example. The one or more frames 222, 223, 234 may be attached to and/or integrated with each other in various forms. The main frame 222 is attached to and/or integrated with one or more of the window frame 400 and the vent stop 330. The main frame 222 provides the primary support for the frame assembly 210 of the lever mechanism 200. For example, the handle extension 211 can be mounted to the main transmission 215 at the main frame 222. The main transmission 215 may extend through the main frame 222 and a secondary frame 223, for example. In certain embodiments, a shoulder washer 224 is coupled between the main frame 222 and the secondary frame 223, and around the main transmission 215, to reduce friction between the main transmission 215 and the frames 222, 223.

The secondary frame 223 is coupled to and/or integrated with the main frame 222. The secondary frame 223 provides additional support for the frame assembly 210 of the lever mechanism 200. In certain embodiments, the secondary frame 223 can provide a ledge or any suitable mechanism for receiving one or more covers 235, 236. In various embodiments, the support frame 234 attaches to and/or is integrated with one or more of the main frame 222, the secondary frame 223, the window frame 400 and/or the vent stop 330. The support frame 234 may provide additional support for the frame assembly 210 and a skeleton for the one or more covers 235, 236. In certain embodiments, the guide arm slide bar 231 is mounted to the support frame 234. Various embodiments provide one or more covers 235, 236 for housing at least a portion of the frame assembly 210 to present a clean finish. For example, the covers 235, 236 can wrap around the support frame 234 and wedge between the main frame 222 and the ledge created by the secondary frame 223, among other things, as illustrated in FIGS. 4-5, 9-10, and 14-15.

Figure 4:
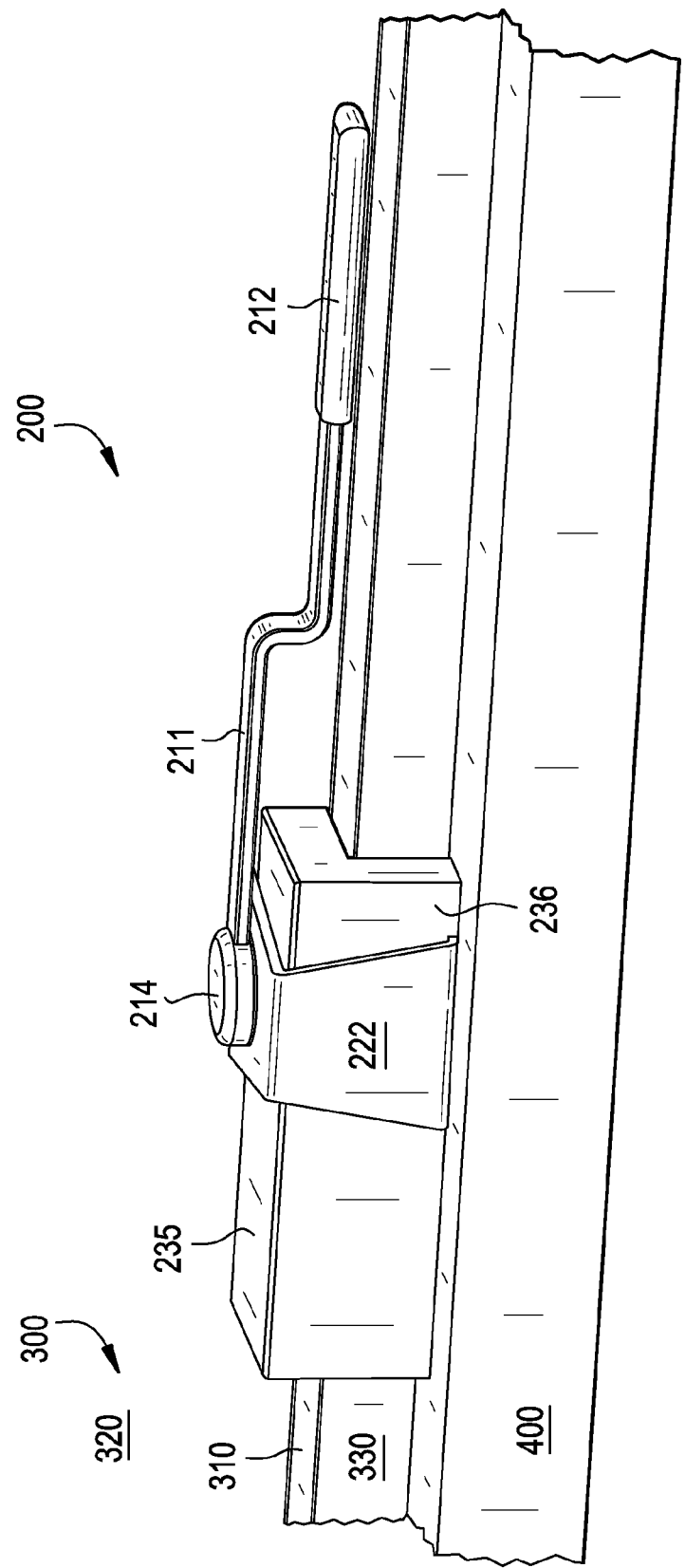
FIG. 4 is a diagram that illustrates a front perspective view of an exemplary double-acting lever mechanism in a locked/closed position in accordance with an embodiment of the present invention.
Figure 9:
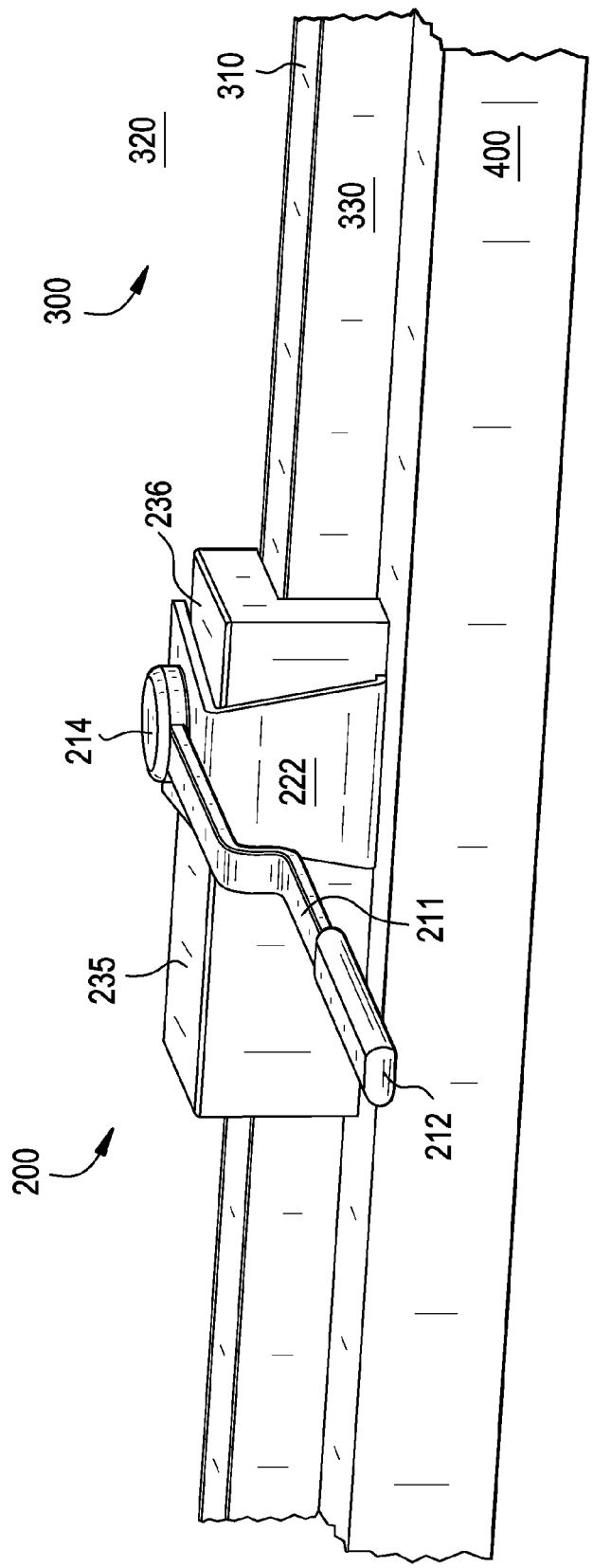
FIG. 9 is a diagram that illustrates a front perspective view of an exemplary double-acting lever mechanism in an unlocked/closed position in accordance with an embodiment of the present invention.
Figure 14:
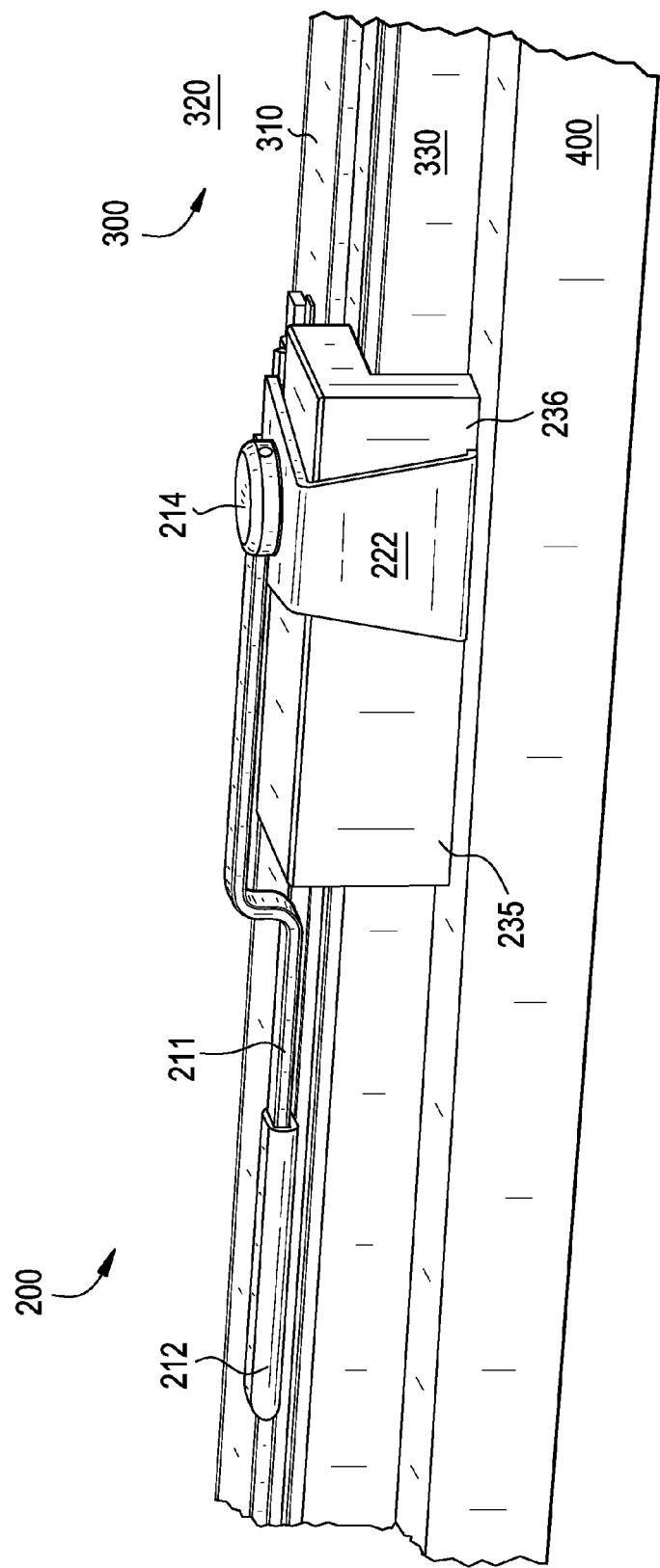
FIG. 14 is a diagram that illustrates a front perspective view of an exemplary double-acting lever mechanism in an unlocked/open position in accordance with an embodiment of the present invention.

FIG. 4 is a diagram that illustrates a front perspective view of an exemplary double-acting lever mechanism 200 in a locked/closed position in accordance with an embodiment of the present invention. FIG. 9 is a diagram that illustrates a front perspective view of an exemplary double-acting lever mechanism 200 in an unlocked/closed position in accordance with an embodiment of the present invention. FIG. 14 is a diagram that illustrates a front perspective view of an exemplary double-acting lever mechanism 200 in an unlocked/open position in accordance with an embodiment of the present invention. Referring to FIGS. 4, 9, and 14, there is shown a lever mechanism 200, a vent 300, and a window frame 400. The vent comprises a vent sash 310, glass 320 and a vent stop 330.

The lever mechanism 200 comprises a telescopic handle 212 adjustably attached to a handle extension 211. The handle extension 211 is secured within a top cap 214 at a main frame 222. Certain embodiments of the lever mechanism 200 provide covers 235, 236 for housing at least a portion of the lever mechanism 200 to present a clean finish. As illustrated in FIG. 4, the handle extension 211 is in an exemplary position where the sash 310 is locked and closed. As illustrated in FIG. 9, the handle extension 211 is in an exemplary position where the sash 310 is unlocked and closed. As illustrated in FIG. 14, the handle extension 211 is in an exemplary position where the sash 310 is unlocked and open. The lever mechanism 200 illustrated in FIGS. 4, 9, and 14 share various characteristics with the lever mechanism 200 illustrated in FIGS. 2-3 as described above.

Figure 5:
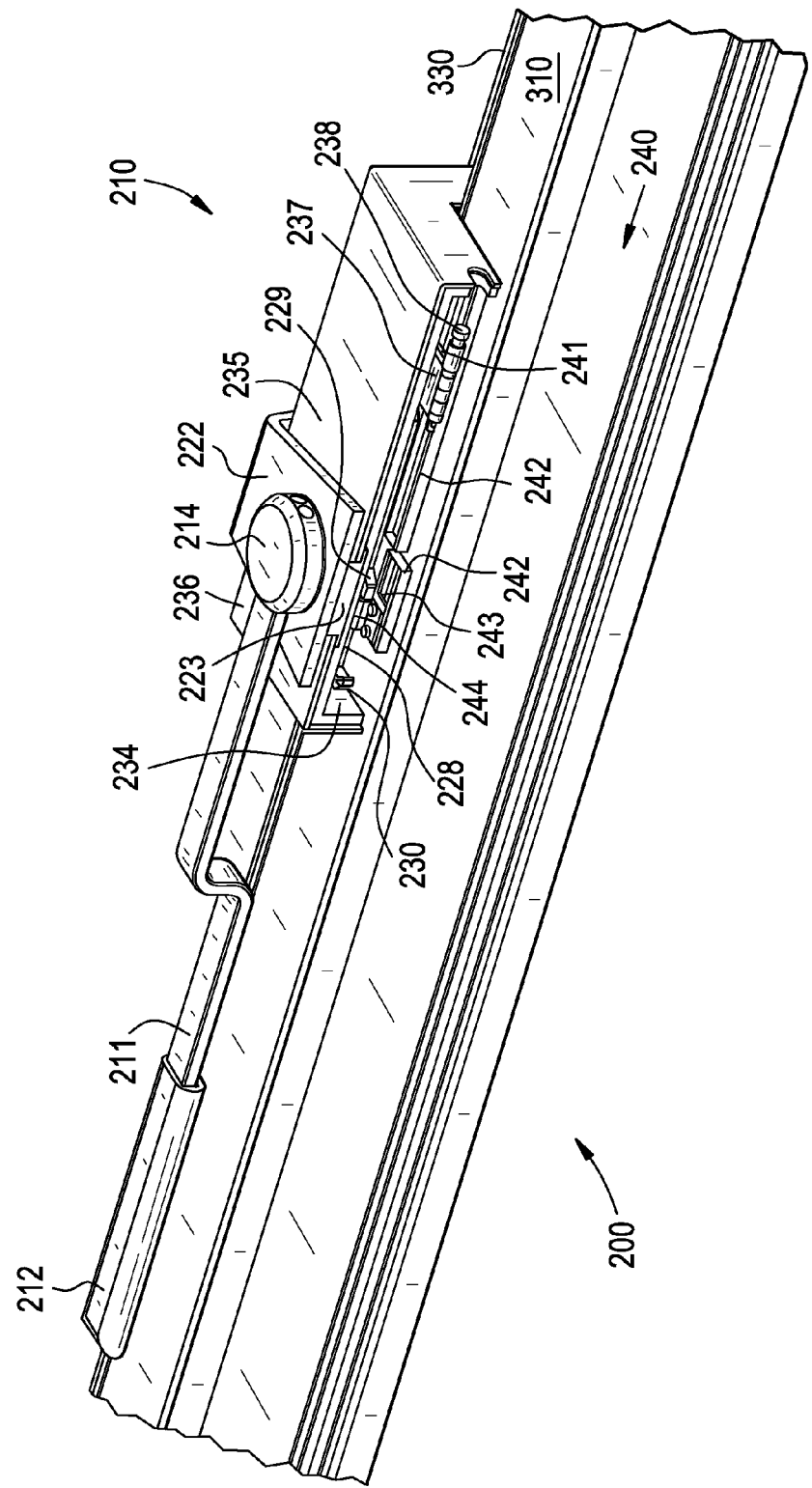
FIG. 5 is a diagram that illustrates a rear perspective view of an exemplary double-acting lever mechanism in a locked/closed position in accordance with an embodiment of the present invention.
Figure 10:
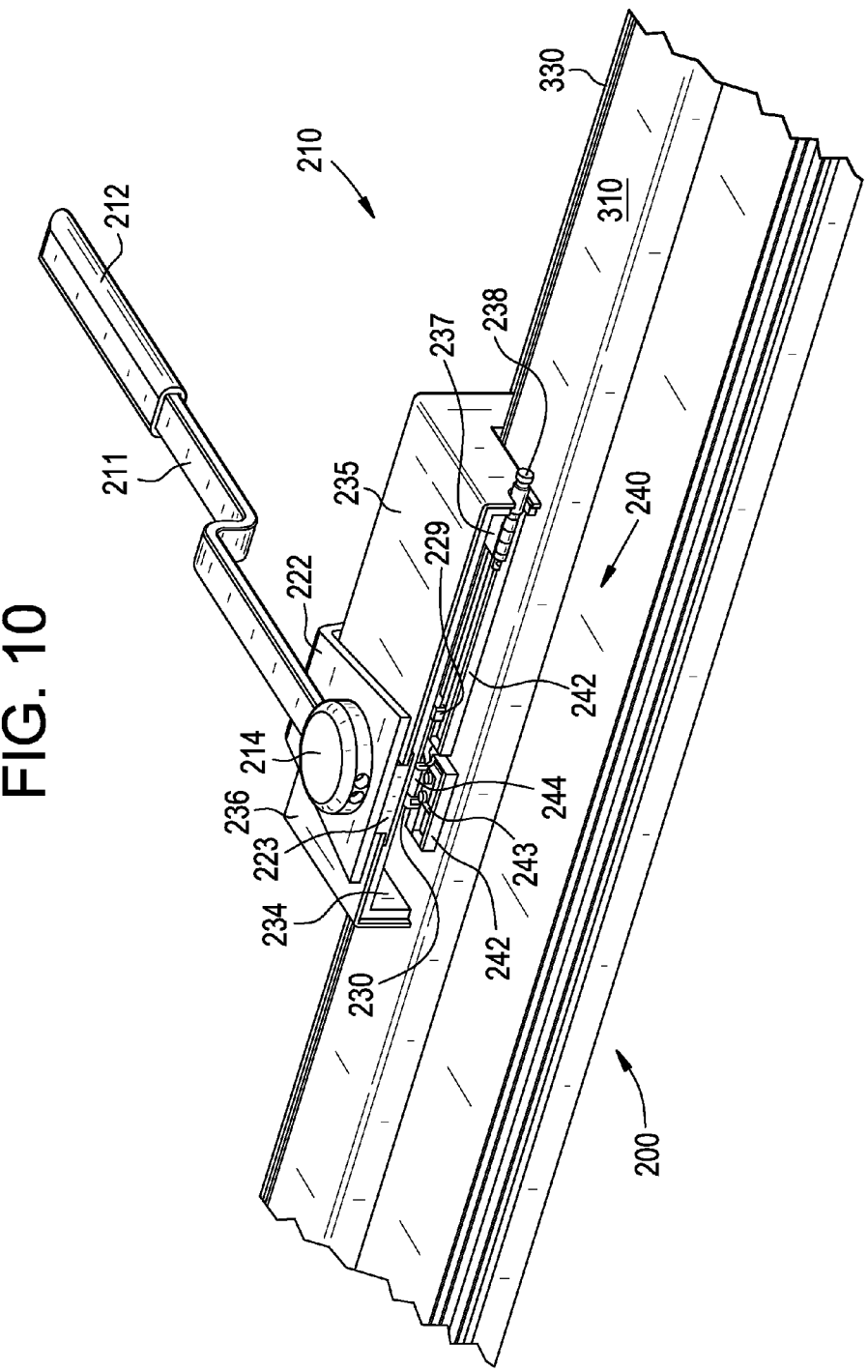
FIG. 10 is a diagram that illustrates a rear perspective view of an exemplary double-acting lever mechanism in an unlocked/closed position in accordance with an embodiment of the present invention.

FIG. 5 is a diagram that illustrates a rear perspective view of an exemplary double-acting lever mechanism 200 in a locked/closed position in accordance with an embodiment of the present invention. FIG. 10 is a diagram that illustrates a rear perspective view of an exemplary double-acting lever mechanism 200 in an unlocked/closed position in accordance with an embodiment of the present invention. FIG. 15 is a diagram that illustrates a rear perspective view of an exemplary double-acting lever mechanism 200 in an unlocked/open position in accordance with an embodiment of the present invention. Referring to FIGS. 5, 10, and 15, there is shown a lever mechanism 200, a vent sash 310, and a vent stop 330.

The lever mechanism 200 comprises a frame assembly 210 and a window sash assembly 240. The frame assembly 210 comprises a telescopic handle 212 adjustably attached to a handle extension 211. The handle extension 211 is secured within a top cap 214 at a main frame 222. Certain embodiments of the lever mechanism 200 provide covers 235, 236 for housing at least a portion of the lever mechanism 200 to present a clean finish. The covers 235, 236 may wrap around a support frame 234 and couple between the main frame 222 and a secondary frame 223. The frame assembly 210 comprises a guide arm 228, a hinge mount 237 and a quick release pin 238. The guide arm comprises projections 229, 230.

The window sash assembly 240 comprises hinge mount slide 241, sash slide bars 242, a transmission fork slide 243, and a transmission fork 244. The sash slide bars 242 are mounted to the vent sash 310 and are configured to receive a hinge mount slide 241 and transmission fork slide 245. The hinge mount slide 241 and the transmission fork slide 245 are slidable within the sash slide bars 242. The hinge mount slide 241 releasably couples with the hinge mount 237 at the quick release pin 238, or any suitable releasable attachment mechanism. The transmission fork 244 may extend through a transmission fork slot 311 (illustrated in FIGS. 2-3) of the sash 310 and couple at one end to a locking mechanism. The other end of the transmission fork 244 may be coupled to the transmission fork slide 243. In certain embodiments, the transmission fork 244 can slide with transmission fork slide 243 within sash slide bar 242 so that the locking mechanism can lock or unlock the vent sash 310 when the transmission fork 244 is engaged, by projections 229, 230 of the guide arm 228.

As illustrated in FIG. 5, the handle extension 211 is in an exemplary position where the sash 310 is locked and closed. As illustrated in FIG. 10, the handle extension 211 is in an exemplary position where the sash 310 is unlocked and closed. As illustrated in FIG. 15, the handle extension 211 is in an exemplary position where the sash 310 is unlocked and open. The lever mechanism 200 illustrated in FIGS. 5, 10, and 15 share various characteristics with the lever mechanism 200 illustrated in FIGS. 2-4, 9, and 14 as described above.

Figure 6:
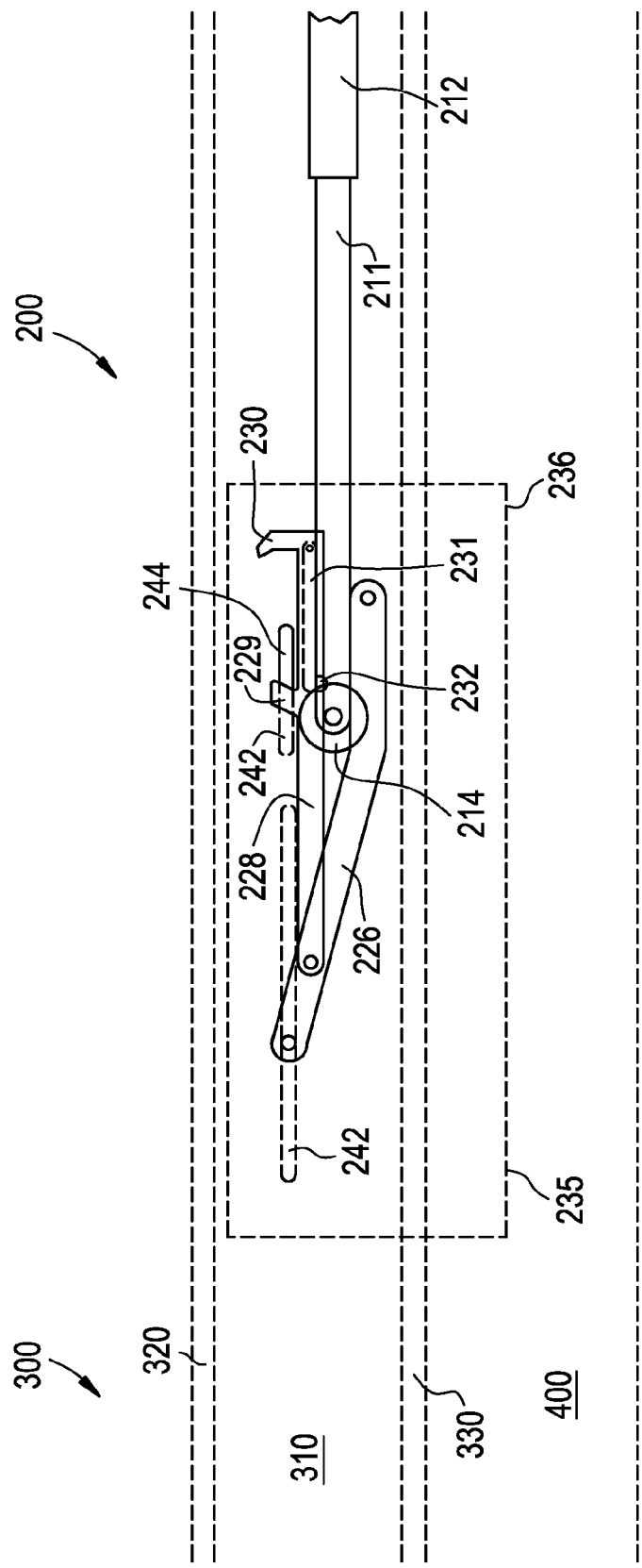
FIG. 6 is a diagram that illustrates a top view of an exemplary double-acting lever mechanism in a locked/closed position in accordance with an embodiment of the present invention.
Figure 11:
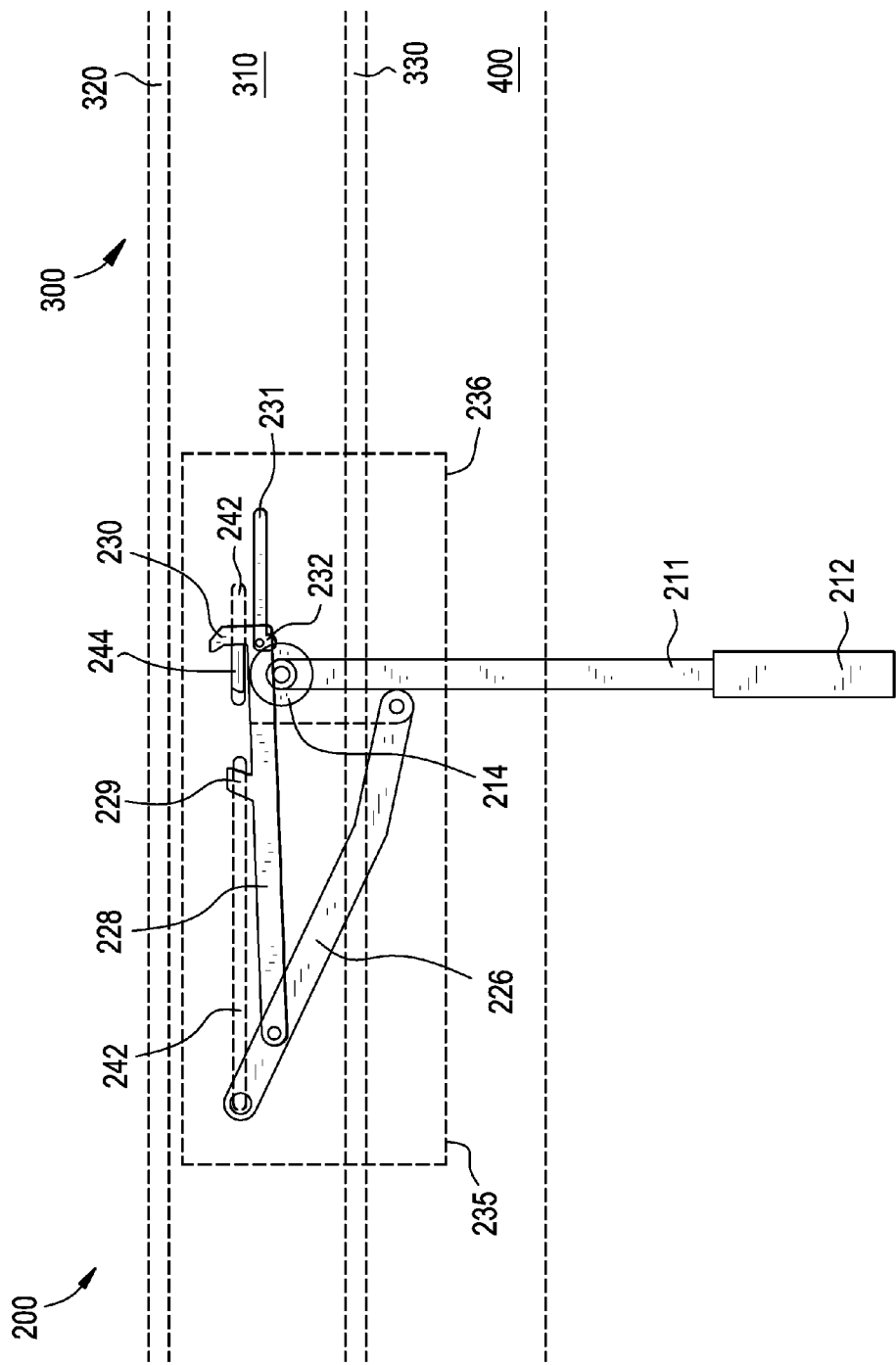
FIG. 11 is a diagram that illustrates a top view of an exemplary double-acting lever mechanism in an unlocked/closed position in accordance with an embodiment of the present invention.

FIG. 6 is a diagram that illustrates a top view of an exemplary double-acting lever mechanism 200 in a locked/closed position in accordance with an embodiment of the present invention. FIG. 11 is a diagram that illustrates a top view of an exemplary double-acting lever mechanism 200 in an unlocked/closed position in accordance with an embodiment of the present invention. FIG. 16 is a diagram that illustrates a top view of an exemplary double-acting lever mechanism 200 in an unlocked/open position in accordance with an embodiment of the present invention. Referring to FIGS. 6, 11, and 16, there is shown a lever mechanism 200, a vent 300, and a window frame 400. The vent comprises a vent sash 310, glass 320 and a vent stop 330.

The lever mechanism 200 comprises a telescopic handle 212 adjustably attached to a handle extension 211. The handle extension 211 is secured within a top cap 214. Certain embodiments of the lever mechanism 200 provide covers 235, 236 for housing at least a portion of the lever mechanism 200 to present a clean finish. The lever mechanism 200 comprises a push arm 226, guide arm 228, guide arm slide bar 231, sash slide bar(s) 242, and a transmission fork 244.

The guide arm 228 is pivotably attached at one end to the push arm 226 towards the hinge mount end of the push arm 226 or with the push arm 226 at a hinge mount 237 (illustrated in FIGS. 2-3), for example. At the other end of the guide arm 228, the guide arm 228 may be pivotably attached to a guide arm slide 233 (illustrated in FIGS. 2-3) that is slidable within a guide arm slide bar 231. The guide arm 228 may comprise projections 229, 230 configured to engage and slide the transmission fork 244 between locked and unlocked positions. The guide arm slide bar 231 directs the guide arm 228 on a linear path such that the guide arm projections 229, 230 engage and slide the transmission fork 244 as the handle extension 211 is rotated. The guide arm slide bar 231 can include a detent 232 for receiving a connecting pin that pivotably attaches the guide arm 228 to the guide arm slide 233.

The sash slide bar(s) 242 are mounted to the vent sash 310 and are configured to receive a hinge mount slide 241 (illustrated in FIGS. 2-3) and transmission fork slide 243 (illustrated in FIGS. 2-3). The transmission fork 244 can slide with transmission fork slide 243 within sash slide bar 242 so that a locking mechanism can lock or unlock the vent sash 310 when the transmission fork 244 is engaged, by projections 229, 230 of the guide arm 228.

As illustrated in FIG. 6, the handle extension 211 is in an exemplary position where the sash 310 is locked and closed. As illustrated in FIG. 11, the handle extension 211 is in an exemplary position where the sash 310 is unlocked and closed. As illustrated in FIG. 16, the handle extension 211 is in an exemplary position where the sash 310 is unlocked and open. The lever mechanism 200 illustrated in FIGS. 6, 11, and 16 share various characteristics with the lever mechanism 200 illustrated in FIGS. 2-5, 9-10, and 14-15 as described above.

Figure 7:
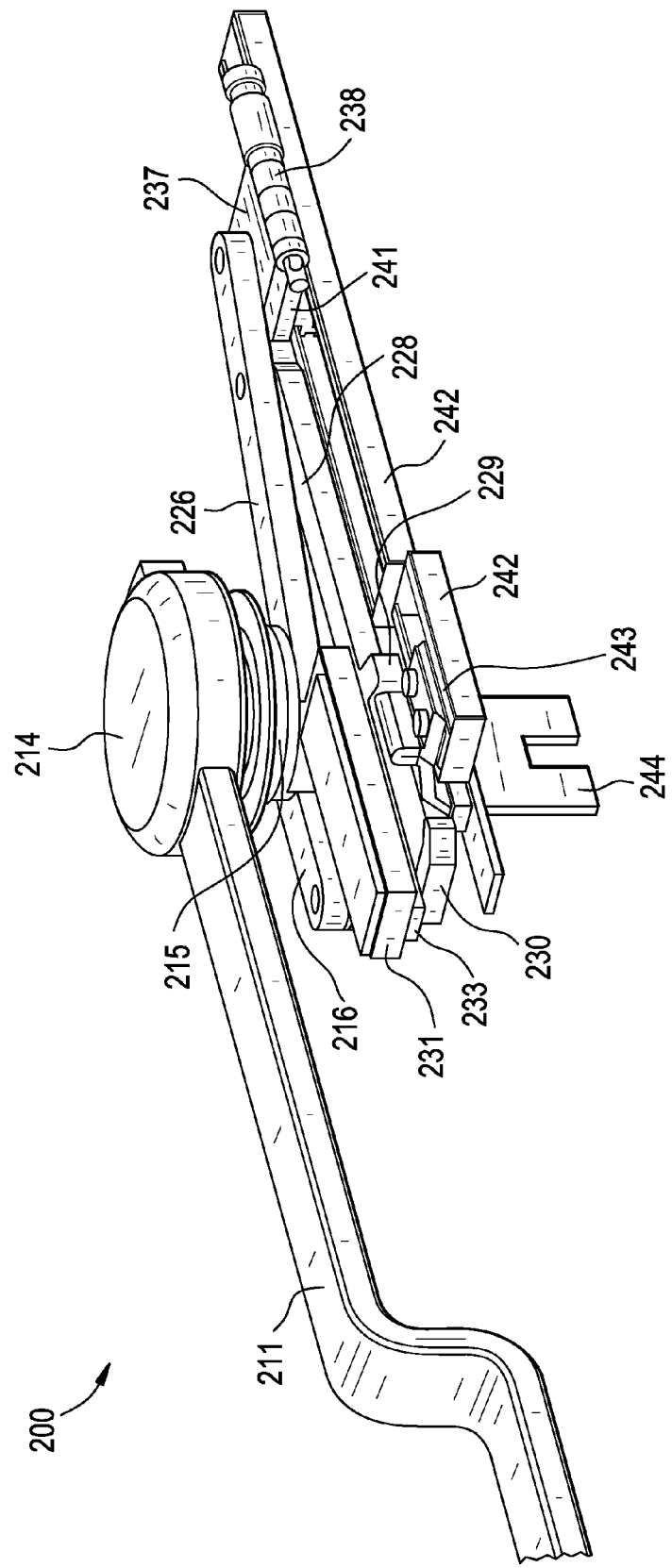
FIG. 7 is a diagram that illustrates a rear, top, perspective view of an exemplary double-acting lever mechanism in a locked/closed position and without frames and covers in accordance with an embodiment of the present invention.
Figure 12:
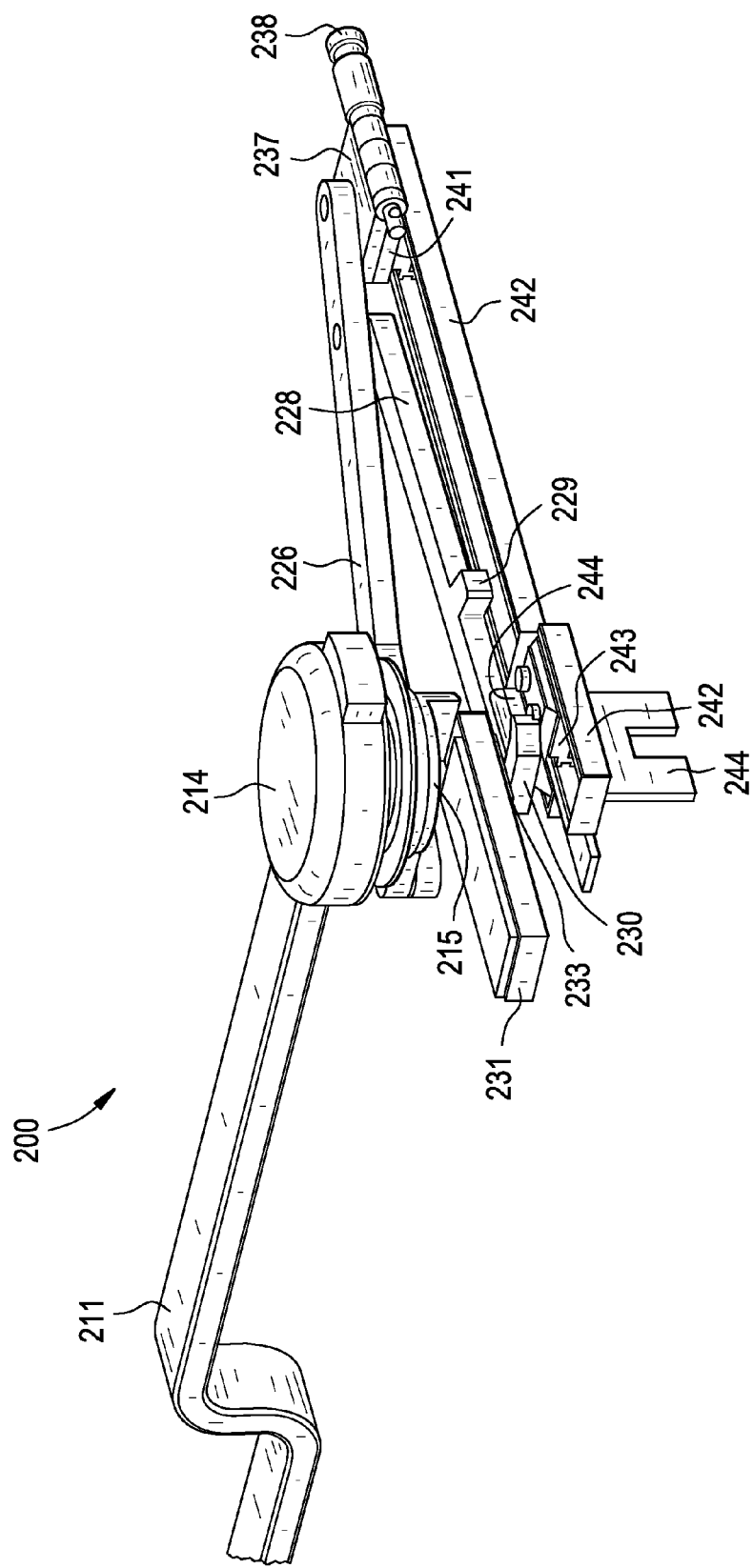
FIG. 12 is a diagram that illustrates a rear, top, perspective view of an exemplary double-acting lever mechanism in an unlocked/closed position and without frames and covers in accordance with an embodiment of the present invention.
Figure 17:
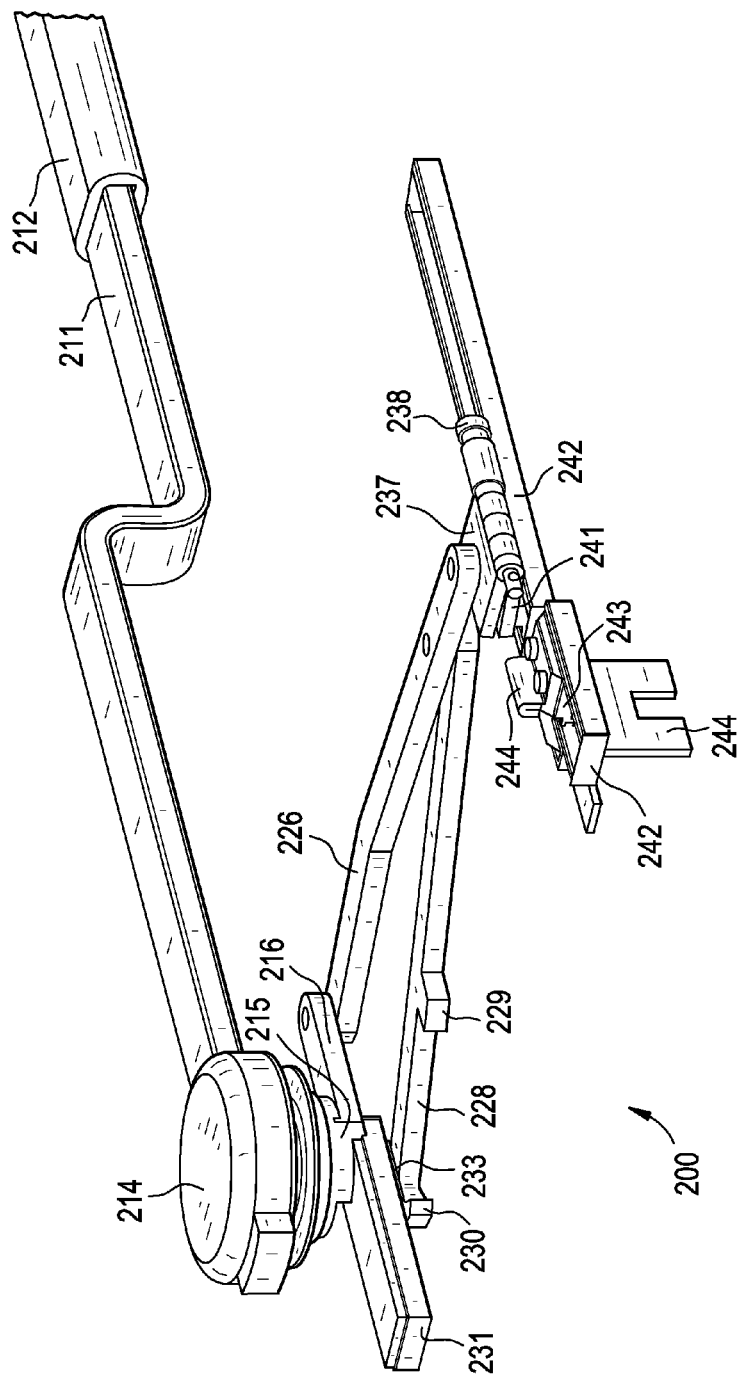
FIG. 17 is a diagram that illustrates a rear, top, perspective view of an exemplary double-acting lever mechanism in an unlocked/open position and without frames and covers in accordance with an embodiment of the present invention.

FIG. 7 is a diagram that illustrates a rear, top, perspective view of an exemplary double-acting lever mechanism 200 in a locked/closed position and without frames 222, 223, 234 and covers 235, 236 in accordance with an embodiment of the present invention. FIG. 12 is a diagram that illustrates a rear, top, perspective view of an exemplary double-acting lever mechanism 200 in an unlocked/closed position and without frames 222, 223, 234 and covers 235, 236 in accordance with an embodiment of the present invention. FIG. 17 is a diagram that illustrates a rear, top, perspective view of an exemplary double-acting lever mechanism 200 in an unlocked/open position and without frames 222, 223, 234 and covers 235, 236 in accordance with an embodiment of the present invention. Referring to FIGS. 7, 12, and 17, there is shown a lever mechanism 200 without the frames 222, 223, 234, covers 235, 236, vent 300, and window frame 400.

The lever mechanism 200 comprises a handle extension 211 secured within a top cap 214 to a main transmission 215. The lever mechanism 200 comprises a push arm 226, guide arm 228, guide arm slide bar 231, guide arm slide 233, hinge mount 237, quick release pin 238, hinge mount slide 241, sash slide bars 242, transmission fork slide 243, and a transmission fork 244. The push arm 226 is pivotably attached to the main transmission 215 at one end and to the hinge mount 237 at the other end. The guide arm 228 is pivotably attached at one end to the push arm 226 towards the hinge mount end of the push arm 226 or with the push arm 226 at a hinge mount 237, for example. At the other end of the guide arm 228, the guide arm 228 may be pivotably attached to a guide arm slide 233 that is slidable within a guide arm slide bar 231. The guide arm 228 may comprise projections 229, 230 configured to engage and slide the transmission fork 244 between locked and unlocked positions. The guide arm slide bar 231 directs the guide arm slide 233 attached to the guide arm 228 on a linear path such that the guide arm projections 229, 230 engage and slide the transmission fork 244 as the handle extension 211 is rotated.

The sash slide bars 242 are configured to receive a hinge mount slide 241 and transmission fork slide 243. The transmission fork 244 can slide with transmission fork slide 243 within sash slide bar 242 so that a locking mechanism can lock or unlock the vent sash 310 when the transmission fork 244 is engaged, by projections 229, 230 of the guide arm 228. The hinge mount slide 241 is releasably attached to a hinge mount 237 using a quick release pin 238, or any suitable releasable attachment mechanism. Rotation or pivoting of the handle extension 211 of the frame assembly 210 causes the push arm 226 pivotably attached to the hinge mount 237 to slide the hinge mount slide 241 within the sash slide bar 242 in a first direction to extend the vent sash 310 to an open position, or in a second direction to retract the vent sash 310 to a closed position, when the sash assembly 240 is coupled to the frame assembly 210.

As illustrated in FIG. 7, the handle extension 211 is in an exemplary position where the sash 310 is locked and closed. As illustrated in FIG. 12, the handle extension 211 is in an exemplary position where the sash 310 is unlocked and closed. As illustrated in FIG. 17, the handle extension 211 is in an exemplary position where the sash 310 is unlocked and open. The lever mechanism 200 illustrated in FIGS. 7, 12, and 17 share various characteristics with the lever mechanism 200 illustrated in FIGS. 2-6, 9-11, and 14-16 as described above.

Figure 8:
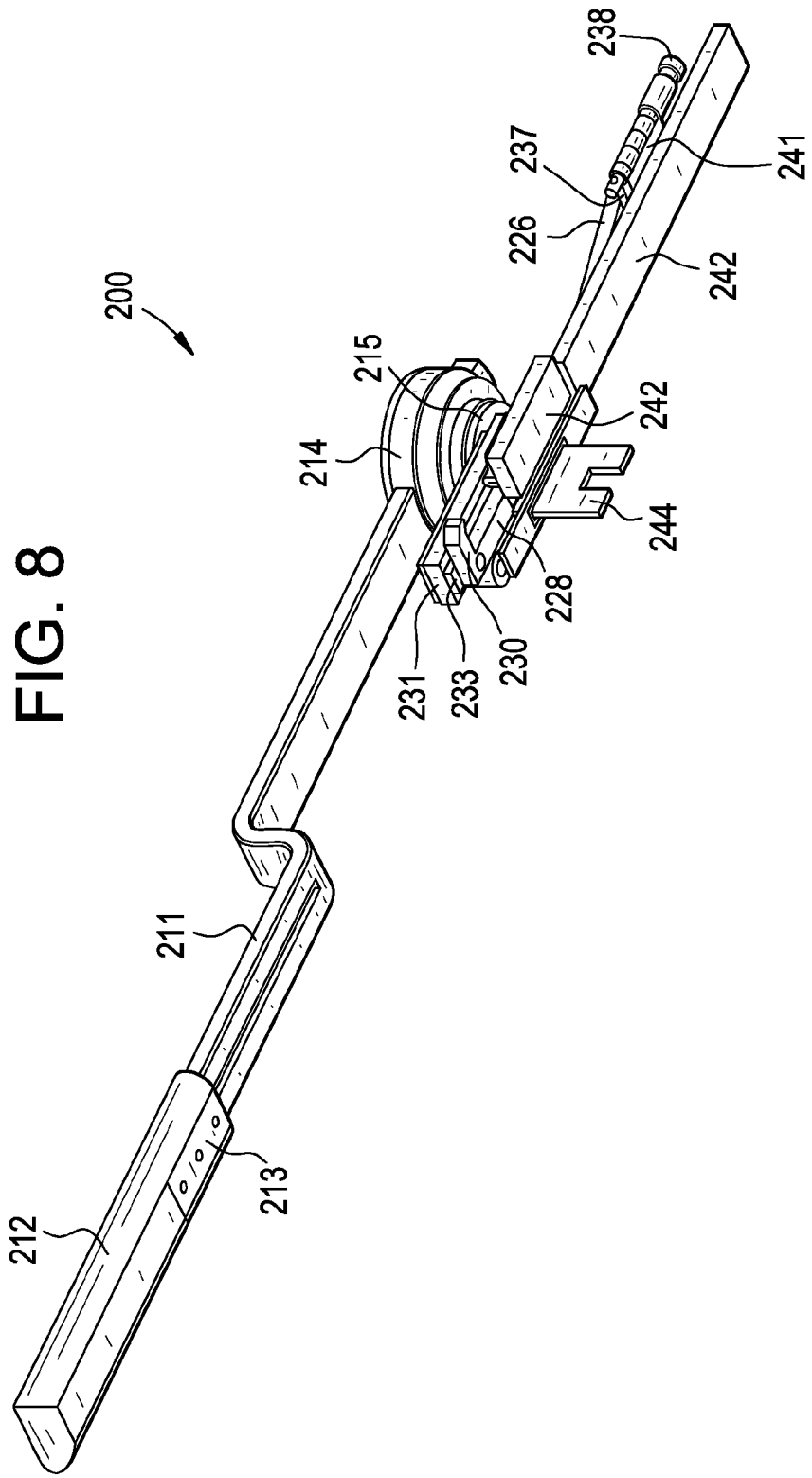
FIG. 8 is a diagram that illustrates a rear, bottom, perspective view of an exemplary double-acting lever mechanism in a locked/closed position and without frames and covers in accordance with an embodiment of the present invention.
Figure 13:
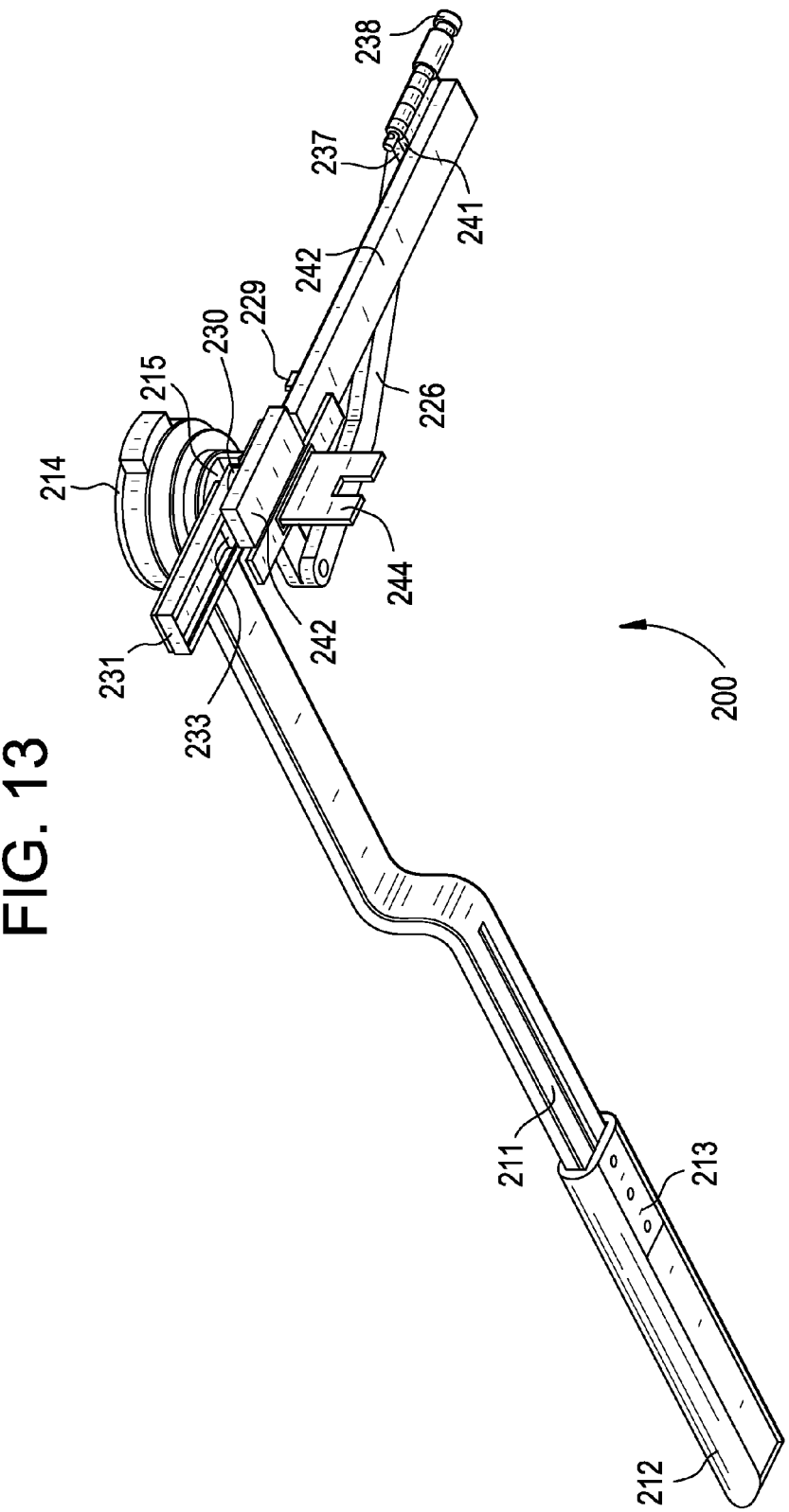
FIG. 13 is a diagram that illustrates a rear, bottom, perspective view of an exemplary double-acting lever mechanism in an unlocked/closed position and without frames and covers in accordance with an embodiment of the present invention.

FIG. 8 is a diagram that illustrates a rear, bottom, perspective view of an exemplary double-acting lever mechanism 200 in a locked/closed position and without frames 222, 223, 234 and covers 235, 236 in accordance with an embodiment of the present invention. FIG. 13 is a diagram that illustrates a rear, bottom, perspective view of an exemplary double-acting lever mechanism 200 in an unlocked/closed position and without frames 222, 223, 234 and covers 235, 236 in accordance with an embodiment of the present invention. FIG. 18 is a diagram that illustrates a rear, bottom, perspective view of an exemplary double-acting lever mechanism 200 in an unlocked/open position and without frames 222, 223, 234 and covers 235, 236 in accordance with an embodiment of the present invention. Referring to FIGS. 8, 13, and 18, there is shown a lever mechanism 200 without the frames 222, 223, 234, covers 235, 236, vent 300, and window frame 400.

The lever mechanism 200 comprises a telescopic handle 212 adjustably attached to a handle extension 211 at a threaded insert 213. The handle extension 211 is secured within a top cap 214 to a main transmission 215. The lever mechanism 200 comprises a push arm 226, guide arm 228, guide arm slide bar 231, guide arm slide 233, hinge mount 237, quick release pin 238, hinge mount slide 241, sash slide bars 242, and a transmission fork 244. The push arm 226 is pivotably attached to the main transmission 215 at one end and to the hinge mount 237 at the other end. The guide arm 228 is pivotably attached at one end to the push arm 226 towards the hinge mount end of the push arm 226 or with the push arm 226 at a hinge mount 237, for example. At the other end of the guide arm 228, the guide arm 228 may be pivotably attached to a guide arm slide 233 that is slidable within a guide arm slide bar 231. The guide arm 228 may comprise projections 229, 230 configured to engage and slide the transmission fork 244 between locked and unlocked positions. The guide arm slide bar 231 directs the guide arm slide 233 attached to the guide arm 228 on a linear path such that the guide arm projections 229, 230 engage and slide the transmission fork 244 as the handle extension 211 is rotated.

The sash slide bars 242 are configured to receive a hinge mount slide 241 and transmission fork slide 243 (illustrated in FIGS. 2-3). The transmission fork 244 can slide with transmission fork slide 243 within sash slide bar 242 so that a locking mechanism can lock or unlock the vent sash 310 when the transmission fork 244 is engaged, by projections 229, 230 of the guide arm 228. The hinge mount slide 241 is releasably attached to a hinge mount 237 using a quick release pin 238, or any suitable releasable attachment mechanism. Rotation or pivoting of the handle extension 211 of the frame assembly 210 causes the push arm 226 pivotably attached to the hinge mount 237 to slide the hinge mount slide 241 within the sash slide bar 242 in a first direction to extend the vent sash 310 to an open position, or in a second direction to retract the vent sash 310 to a closed position, when the sash assembly 240 is coupled to the frame assembly 210.

As illustrated in FIG. 8, the handle extension 211 is in an exemplary position where the sash 310 is locked and closed. As illustrated in FIG. 13, the handle extension 211 is in an exemplary position where the sash 310 is unlocked and closed. As illustrated in FIG. 18, the handle extension 211 is in an exemplary position where the sash 310 is unlocked and open. The lever mechanism 200 illustrated in FIGS. 8, 13, and 18 share various characteristics with the lever mechanism 200 illustrated in FIGS. 2-7, 9-12, and 14-17 as described above.

In operation, moving the handle extension 211 substantially one hundred eighty (180) degrees on a single plane in a first direction operates to extend a guide arm 228 to unlock a vent sash 310 (as illustrated in FIGS. 9-13) and extend a push arm 226 to open the vent sash 310 (as illustrated in FIGS. 14-18). Inversely, moving the handle extension 211 substantially one hundred eighty (180) degrees on the same single plane in a second direction that is opposite of the first direction operates to retract the push arm 226 to close the vent sash 310 (as illustrated in FIGS. 9-13) and retract the guide arm 228 to lock the vent sash 310 (as illustrated in FIGS. 4-8).

Although FIGS. 4-18 illustrate the lever mechanism 200 pivoting in a first direction (e.g., from right to left) to unlock and open the sash 310 and pivoting in a second direction (e.g., from left to right) to close and lock the sash 310, in certain embodiments the lever mechanism may be configured to pivot in the opposite directions (e.g., from left to right to unlock and open the sash 310, and from right to left to close and lock the sash 310), among other things (e.g., from up to down to unlock and open the sash 310, and from down to up to close and lock the sash, or vice versa), by reconfiguring and/or rotating components of the lever mechanism 200, for example.

FIG. 19 is a flow diagram that illustrates exemplary steps for unlocking, opening, closing and locking a vent sash 310 in accordance with an embodiment of the present invention. Referring to FIG. 19, there is shown a flow diagram 1900, which illustrates exemplary steps for unlocking, opening, closing and locking a vent sash 310. At step 1910, a handle extension 211 is radially pivoted substantially one hundred eighty (180) degrees in a first direction on a single plane from a locked and closed position to an unlocked and open position. At step 1920, the handle extension is radially pivoted substantially one hundred eighty (180) degrees in a second direction, opposite the first direction, on the single plane from the unlocked and open position to the locked and closed position. Although the method is described with reference to the exemplary elements of the systems described above, it should be understood that other implementations are possible.

At step 1910, a handle extension 211 is radially pivoted substantially one hundred eighty (180) degrees in a first direction on a single plane from a locked and closed position to an unlocked and open position. Pivoting the handle extension 211 rotates the main transmission 215. The push arm 226 pivotably attached to the main transmission 215 at the main transmission bar 216 is extended as the main transmission 215 rotates. The guide arm 228 pivotably attached to the push arm 226 is directed on a linear path by the guide arm slide bar 231 such that projection 230 engages the transmission fork 244.

As the transmission fork 244 is engaged by the guide arm projection 230, the transmission fork 244 interacts with a locking mechanism to unlock the vent sash 310. More specifically, the transmission fork 244 slides on transmission fork slide 243 within sash slide bar 242 when the transmission fork 244 is engaged by the guide arm projection 230. As the transmission fork 244 slides on the transmission fork slide 243, the end of the transmission fork 244 that extends through the vent sash 310 and interfaces with the locking mechanism unlocks the vent sash 310.

After unlocking the vent sash 310, a connecting pin that pivotably couples the guide arm 228 to a guide arm slide 233 that is slidable in the guide arm slide bar 231 becomes lodged in a detent 232 of the guide arm slide bar 231 such that the guide arm 238 rotates at the detent 232 as the sash 310 is opened. Meanwhile, as the push arm 226 is extended, the hinge mount 237 pivotably coupled to the push arm 226 slides on hinge mount slide 241 in the sash slide bar 242. As the push arm 226 slides on the hinge mount slide 241 in the sash slide bar 242, the vent sash 310 is pushed open.

At step 1920, the handle extension 211 is radially pivoted substantially one hundred eighty (180) degrees in a second direction, opposite the first direction, on the single plane from the unlocked and open position to the locked and closed position. As the handle extension 211 is pivoted in the second direction, the push arm 226 attached to the hinge mount 237 retracts by sliding on the hinge mount 241 in the sash slide bar 242, pulling the vent sash 310 closed. As the vent sash 310 closes, a roller guide 227 attached to the push arm 226 is received by a catch 225 attached to or integrated with the main frame 222. The catch 225 guides the roller guide 227 and push arm 226 such that the push arm 226 pulls the vent sash 310 taut against the vent stop 330 while the vent sash 310 is in a closed position and is being locked. The guide arm 228 is rotated at the detent 232 as the vent sash 310 is pulled into a closed position.

When the vent sash 310 closes, the detent pin 217 of the main transmission 215, which is rotating as the handle extension 211 is pivoted, dislodges the connecting pin from the detent 232 such that the guide arm 228 slides back on the guide arm slide 233 along the linear path as directed by the guide arm slide bar 231. As the guide arm 228 slides back on the guide arm slide 233, the guide arm projection 229 engages the transmission fork 244 such that the transmission fork 244 interacts with the locking mechanism to lock the vent sash 310. More specifically, the transmission fork 244 slides on the transmission fork slide 243 within sash slide bar 242 when the transmission fork 244 is engaged by the guide arm projection 229. As the transmission fork 244 slides on the transmission fork slide 243, the end of the transmission fork 244 that extends through the vent sash 310 and interfaces with the locking mechanism locks the vent sash 310.

In certain embodiments, by configuring the handle extension 211 and/or telescopic handle 212 length, the force required to pivot the lever mechanism 200, to both unlock/open and close/lock the vent sash 310, does not exceed five (5) pounds (lbs.), irrespective of the size and weight of the vent sash 310. In various embodiments, pivoting the lever mechanism 200 substantially one hundred eighty (180) degrees on a single plane in a first direction to unlock/open a vent sash 310, and pivoting the lever mechanism 200 substantially one hundred eighty (180) degrees on the same single plane in a second direction to close/lock the vent sash 310 does not involve excessive twisting or turning of an operator's wrist.

Certain embodiments provide that the lever mechanism 200 may be retrofitted to replace an existing vent handle 101 such that the lever mechanism 200 operates with an existing locking mechanism of a vent 300. Additionally and/or alternatively, the lever mechanism 200 may be manufactured as a part of a locking mechanism of a vent 300. Additionally and/or alternatively, the lever mechanism 200 may be manufactured to be integrated within a window frame 400 and attached to a locking mechanism of a vent 300.

In various embodiments, the push arm 226 and/or guide arm 228 may restrict or limit the distance the vent sash 310 may open. Further, the push arm 226 and/or guide arm 228 can help secure and support the vent sash 310 such that it does not blow out from negative pressure when in an open position.

In certain embodiments, the lever mechanism 200 may be operable to pivot one hundred eight (180) degrees in substantially the horizontal plane (i.e., within five degrees in either direction of a plane that is parallel to the base of the vent sash 310 or window frame 400, for example) such that the lever mechanism 200 is accessible at a particular height for all operations (e.g., unlocking, opening, closing and locking).

Certain embodiments provide a lever mechanism system 200 for unlocking, opening, closing and locking a vent sash 310. The lever mechanism system 200 may comprise a push arm 226 configured to extend to open the vent sash 310 and retract to close the vent sash 310. The lever mechanism system 200 may comprise a guide arm 228 configured to extend to unlock the vent sash 310 and retract to lock the vent sash 310. The lever mechanism system 200 may comprise a handle extension 211 configured to radially rotate substantially one hundred eighty degrees in a first direction on a single plane to extend the push arm 226 and the guide arm 228. The handle extension 211 may be configured to radially rotate substantially one hundred eighty degrees in a second direction on the single plane to retract the push arm 226 and the guide arm 228.

In various embodiments, the lever mechanism system 200 may comprise at least one cover 235, 236 configured to house at least a portion of the lever mechanism system 200.

In certain embodiments, the lever mechanism system 200 may comprise a valance 246 configured to cover at least a portion of the lever mechanism system 200.

In various embodiments, the second direction is opposite the first direction.

In certain embodiments, the lever mechanism system 200 may comprise a handle 212 configured to adjustably attach to the handle extension 211.

In various embodiments, the handle 212 is at least one of telescopic, collapsible, and foldable.

In certain embodiments, the handle extension 211 is at least one of telescopic, collapsible and foldable.

In various embodiments, the lever mechanism system 200 may comprise a transmission fork 244. The transmission fork 244 interfaces with a locking mechanism. The guide arm 228 is configured to engage the transmission fork 244 to unlock and lock the vent sash 310.

In certain embodiments, the locking mechanism comprises a plurality of locking points 108 for disengageably coupling to a corresponding plurality of keepers 107.

In various embodiments, the guide arm 228 comprises at least one projection 229, 230 configured to engage the transmission fork 244 when the guide arm 228 is at least one of extended and retracted.

In certain embodiments, at least one of the push arm 226 and the guide arm 228 are releasably attached 238 to the vent sash 310.

In various embodiments, the lever mechanism system 200 may comprise a main transmission 215 attached to the handle extension 211 and pivotably attached to the push arm 226. The radial rotation of the handle extension 211 in the first direction pivots the main transmission 215 in a first transmission direction to extend the push arm 226. The radial rotation of the handle extension 211 in the second direction pivots the main transmission 215 in a second transmission direction to retract the push arm 226.

In certain embodiments, the push arm 226 comprises a roller guide 227.

In various embodiments, the lever mechanism system 200 may comprise a catch 225 configured to receive the roller guide 227, wherein receiving the roller guide 227 at the catch 225 pulls the vent sash 310 taut in a closed position.

In certain embodiments, the single plane is a substantially horizontal plane.

In various embodiments, a force applied to radially rotate the handle extension 211 substantially one hundred eighty degrees on the single plane in each of the first direction and the second direction does not exceed five pounds.

In certain embodiments, at least one of the push arm 226 and the guide arm 228 restricts an amount the vent sash 310 is opened.

In various embodiments, the handle extension 211 attaches to the main transmission 215 at a frame 222, 223, 234, which attaches to at least one of a window frame 400 and a vent stop 310.

Various embodiments provide a method 1900 for unlocking, opening, closing and locking a vent sash. The method 1900 may comprise radially pivoting 1910 a handle extension 211 substantially one hundred eighty degrees in a first direction on a single plane from a locked and closed position to an unlocked and open position. The method 1900 may comprise radially pivoting 1920 the handle extension 211 substantially one hundred eighty degrees in a second direction on the single plane from the unlocked and open position to the locked and closed position.

In certain embodiments, the second direction is opposite the first direction.

In various embodiments, a force applied to radially rotate the handle extension 211 substantially one hundred eighty degrees on the single plane in each of the first direction and the second direction does not exceed five pounds.

In certain embodiments, the single plane is a substantially horizontal plane.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A lever mechanism system for unlocking, opening, closing and locking a vent sash, the system comprising:
    a push arm pivotably coupled to a hinge mount, the hinge mount slidably coupled to a sash assembly coupled to the vent sash, the push arm configured to extend to open the vent sash and retract to close the vent sash;
    a guide arm pivotably attached with the push arm at the hinge mount or to the push arm at a hinge mount end of the push arm, the guide arm engageably coupled to a locking mechanism, the guide arm configured to extend to unlock the vent sash and retract to lock the vent sash; and
    a handle extension configured to:
        radially rotate substantially one hundred eighty degrees in a first direction on a single plane to extend the push arm and the guide arm, and radially rotate substantially one hundred eighty degrees in a second direction on the single plane to retract the push arm and the guide arm.

2. The lever mechanism system according to claim 1, comprising at least one cover configured to house at least a portion of the lever mechanism system.

3. The lever mechanism system according to claim 1, comprising a valance configured to cover at least a portion of the lever mechanism system.

4. The lever mechanism system according to claim 1, wherein the second direction is opposite the first direction.

5. The lever mechanism system according to claim 1, comprising a handle configured to adjustably attach to the handle extension.

6. The lever mechanism system according to claim 1, wherein the sash assembly comprises a sash slide bar and a hinge mount slide, the hinge mount coupled to the hinge mount slide, the sash slide bar mounted to the vent sash and configured to receive the hinge mount slide, and wherein the hinge mount slide is slidable one or more of within and on the sash slide bar.

7. The lever mechanism system according to claim 1, comprising a transmission fork, wherein the transmission fork interfaces between the guide arm and the locking mechanism, and wherein the guide arm is engageably coupled to the locking mechanism via the transmission fork to unlock and lock the vent sash.

8. The lever mechanism system according to claim 7, wherein the locking mechanism comprises a plurality of locking points for disengageably coupling to a corresponding plurality of keepers.

9. The lever mechanism system according to claim 7, wherein the guide arm comprises at least one projection configured to engage the transmission fork when the guide arm is at least one of extended and retracted.

10. The lever mechanism system according to claim 1, wherein at least one of the push arm and the guide arm are releasably attached to the vent sash.

11. The lever mechanism system according to claim 1, comprising a main transmission attached to the handle extension and pivotably attached to the push arm, wherein the radial rotation of the handle extension in the first direction pivots the main transmission in a first transmission direction to extend the push arm, and wherein the radial rotation of the handle extension in the second direction pivots the main transmission in a second transmission direction to retract the push arm.

12. The lever mechanism system according to claim 1, wherein the push arm comprises a roller guide.

13. The lever mechanism system according to claim 12, comprising a catch configured to receive the roller guide, wherein receiving the roller guide at the catch pulls the vent sash taut in a closed position.

14. The lever mechanism system according to claim 1, wherein the single plane is a substantially horizontal plane.

15. The lever mechanism system according to claim 1, wherein a force applied to radially rotate the handle extension substantially one hundred eighty degrees on the single plane in each of the first direction and the second direction does not exceed five pounds.

16. The lever mechanism system according to claim 1, wherein at least one of the push arm and the guide arm restricts an amount the vent sash is opened.

17. The lever mechanism system according to claim 11, wherein the handle extension attaches to the main transmission at a frame, and wherein the frame attaches to at least one of a window frame and a vent stop.

18. A method for unlocking, opening, closing and locking a vent sash, the method comprising:
radially pivoting a handle extension substantially one hundred eighty degrees in a first direction on a single plane from a locked and closed position to an unlocked and open position, the radially pivoting the handle extension in the first direction extending a push arm to open the vent sash and extending a guide arm engageably coupled to a locking mechanism to unlock the vent sash, wherein the push arm is pivotably coupled to a hinge mount, and wherein the hinge mount is slidably coupled to a sash assembly coupled to the vent sash; and
radially pivoting the handle extension substantially one hundred eighty degrees in a second direction on the single plane from the unlocked and open position to the locked and closed position, the radially pivoting the handle extension in the second direction retracting the push arm to close the vent sash and retracting the guide arm to lock the vent sash.

19. The method according to claim 18, wherein the sash assembly comprises a sash slide bar and a hinge mount slide, the hinge mount coupled to the hinge mount slide, the sash slide bar mounted to the vent sash and configured to receive the hinge mount slide, and wherein the hinge mount slide is slidable one or more of within and on the sash slide bar.

20. The method according to claim 18, wherein the second direction is opposite the first direction.

21. The method according to claim 18, wherein a force applied to radially rotate the handle extension substantially one hundred eighty degrees on the single plane in each of the first direction and the second direction does not exceed five pounds.

22. The method according to claim 18, wherein the single plane is a substantially horizontal plane.

* * * * *